US012794125B2

(12) United States Patent
Ieda et al.

(10) Patent No.: US 12,794,125 B2
(45) Date of Patent: Nov. 10, 2026

(54) PATCH ANTENNA AND VEHICULAR ANTENNA DEVICE

(71) Applicant: YOKOWO CO., LTD., Tokyo (JP)

(72) Inventors: Hiroto Ieda, Tomioka (JP); Kazuhiro Kowaita, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 120 days.

(21) Appl. No.: 18/269,287

(22) PCT Filed: Dec. 23, 2021

(86) PCT No.: PCT/JP2021/047993

§ 371 (c)(1),
(2) Date: Jun. 23, 2023

(87) PCT Pub. No.: WO2022/138856

PCT Pub. Date: Jun. 30, 2022

(65) Prior Publication Data

US 2024/0047880 A1 Feb. 8, 2024

(30) Foreign Application Priority Data

Dec. 23, 2020 (JP) ................................ 2020-213440

(51) Int. Cl.
*H01Q 9/04* (2006.01)
*H01Q 1/32* (2006.01)

(52) U.S. Cl.
CPC ......... *H01Q 9/0407* (2013.01); *H01Q 1/3233* (2013.01); *H01Q 1/3275* (2013.01)

(58) Field of Classification Search
CPC .... H01Q 5/385; H01Q 9/0407; H01Q 1/3233; H01Q 1/3275; H01Q 1/362; H01Q 21/28;
(Continued)

(56) References Cited

U.S. PATENT DOCUMENTS

2003/0011521 A1* 1/2003 Edimo ................. H01Q 9/0442 343/846
2008/0036665 A1* 2/2008 Schadler .............. H01Q 9/0435 343/700 MS (Continued)

FOREIGN PATENT DOCUMENTS

JP 2017-191961 A 10/2017
WO 03/041222 A1 5/2003

OTHER PUBLICATIONS

Translation of IDS document (Year: 2003).*

(Continued)

*Primary Examiner* — Alexander H Taningco
*Assistant Examiner* — Anna H Hamadyk
(74) *Attorney, Agent, or Firm* — XSENSUS LLP

(57) ABSTRACT

A patch antenna includes: a radiation element; and n (where n is a natural number of 2 or greater) metal bodies that are positioned above the radiation element, wherein an area of at least one of the n metal bodies is different from an area of any other metal body of the n metal bodies. Further, in the patch antenna, the n is 2 or 3, at least two of the n metal bodies are a first metal body and a second metal body, respectively, the first metal body is provided at a distance equal to or smaller than one-tenth of a wavelength in a desired frequency band, from the radiation element in a direction perpendicular to an upper surface of the radiation element, and the second metal body is arranged at position closest to the first metal body in the direction perpendicular to the upper surface of radiation element.

10 Claims, 24 Drawing Sheets

(58) Field of Classification Search
CPC ...... H01Q 1/526; H01Q 5/364; H01Q 9/0414; H01Q 9/0435; H01Q 9/36
See application file for complete search history.

(56) References Cited

U.S. PATENT DOCUMENTS

| | | | | |
|---|---|---|---|---|
| 2018/0212301 | A1* | 7/2018 | Iino | H01Q 21/30 |
| 2019/0302271 | A1* | 10/2019 | Panther | H01Q 1/1207 |
| 2021/0036426 | A1* | 2/2021 | Iino | H01Q 9/0414 |

OTHER PUBLICATIONS

Chung, "Broadband circularly polarized stacked patch antenna". (Year: 2007).*
Extended European search report issued on Oct. 15, 2024, in corresponding European patent Application No. 21910995.6, 10 pages.
Oluyemi P. Falade et al., "Single Feed Stacked Patch Circular Polarized Antenna for Triple Band GPS Receivers", IEEE Transactions on Antennas and Propagation, IEEE, vol. 60, No. 10, Jul. 10, 2012, pp. 4479-4484, total 6 pages.
International Search Report and Written Opinion mailed on Mar. 22, 2022, received for PCT Application PCT/JP2021/047993, filed on Dec. 23, 2021, 9 pages including English Translation.
Kramer et al., "Vertically Multilayer-Stacked Yagi Antenna with Single and Dual Polarizations" IEEE Transactions on Antennas and Propagation, vol. 58, No. 4, Apr. 2010, pp. 1022-1030.

* cited by examiner

PATCH ANTENNA AND VEHICULAR ANTENNA DEVICE

CROSS-REFERENCE TO RELATED APPLICATIONS

The present application is based on PCT filing PCT/JP2021/047993, filed Dec. 23, 2021, which claims priority to Japanese Patent Application No. 2020-213440, filed Dec. 23, 2020, the entire disclosure of each is incorporated herein.

TECHNICAL FIELD

The present disclosure relates to a patch antenna and a vehicular antenna device.

BACKGROUND ART

There have been patch antennas as planar antennas including radiation elements on dielectric members (for example, PTL 1).

CITATION LIST

Patent Literature

[PTL 1] Japanese Unexamined Patent Application Publication No. 2017-191961

SUMMARY OF INVENTION

Technical Problem

Depending on a configuration of a patch antenna, an axial ratio of at least a part of elevation angles from a low elevation angle to a high elevation angle may be degraded.

An example of an object of the present disclosure is to improve an axial ratio of a patch antenna. Other objects of the present disclosure will be apparent from descriptions of the present specification.

Solution to Problem

An aspect of the present disclosure is a patch antenna, comprising: a radiation element; and n (where n is a natural number of 2 or greater) metal bodies that are positioned above the radiation element, wherein an area of at least one of the n metal bodies is different from an area of any other metal body of the n metal bodies.

Another aspect of the present disclosure is a vehicular antenna device, comprising: the patch antenna of the above-described aspect; and an antenna different from the patch antenna, wherein at least two of the n metal bodies are the first metal body and the second metal body, respectively, and a part of the antenna corresponds to the second metal body.

Still another aspect of the present disclosure is a vehicular antenna device, comprising: the patch antenna of the above-described aspect; and an antenna different from the patch antenna, wherein at least three of the n metal bodies are the first metal body, the second metal body, and a third metal body, respectively, and a part of the antenna corresponds to the third metal body.

Advantageous Effects of Invention

According to an aspect of the present disclosure, it is possible to improve an axial ratio of elevation angles of a patch antenna.

DESCRIPTION OF EMBODIMENTS

Figure 1:
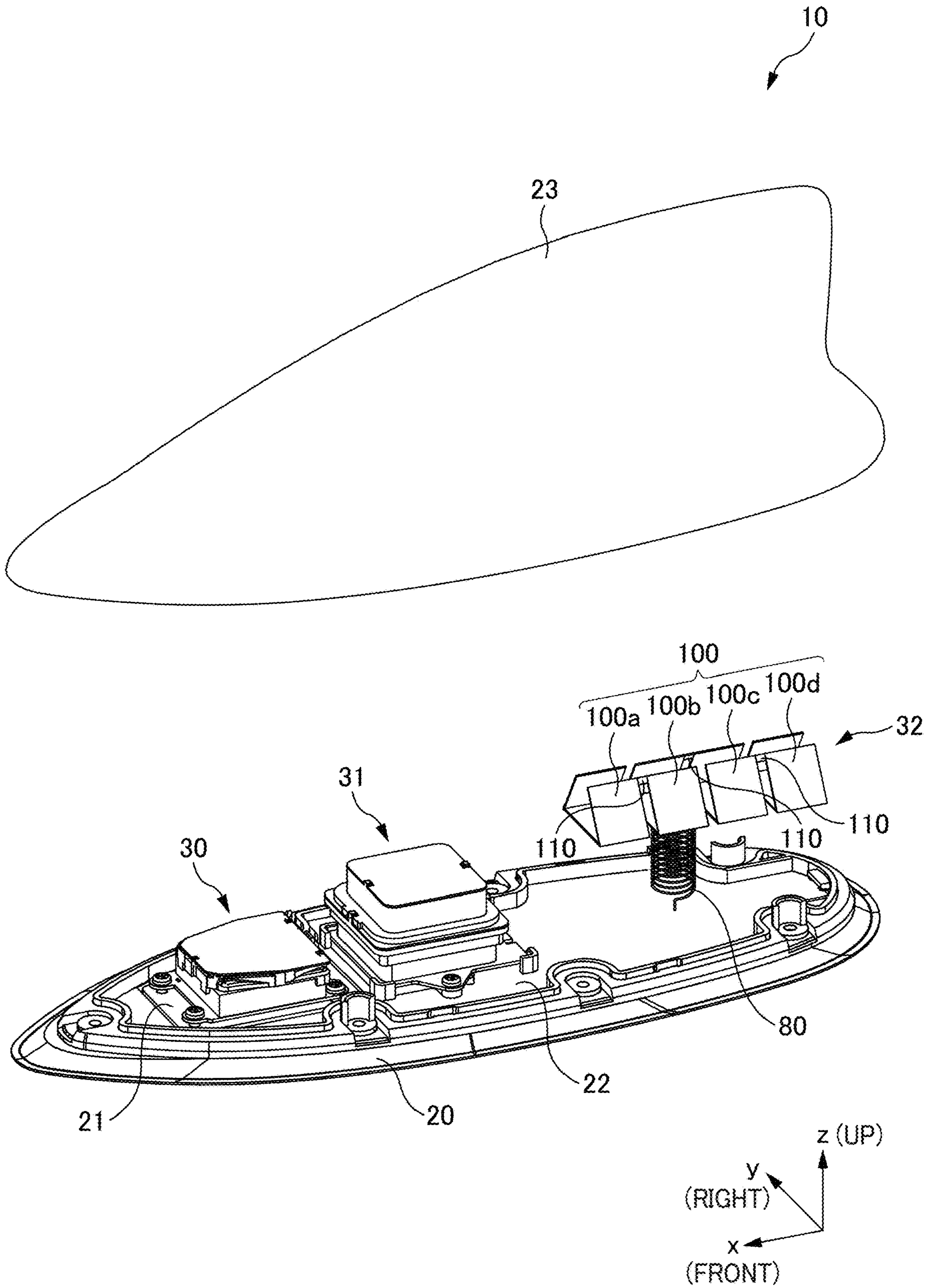
FIG. 1 is a perspective view of a vehicular antenna device 10.

At least following matters will become apparent from the descriptions of the present specification and the accompanying drawings.

The following describes preferable embodiments of the present disclosure with reference to drawings. Components, members, and the like that are the same or equivalent in drawings are given the same reference numerals, and overlapping description thereof is omitted as appropriate.

Embodiment

Overview of Vehicular Antenna Device 10 (First Embodiment)

FIG. 1 is a diagram illustrating a configuration of a vehicular antenna device 10 which is a first embodiment of the present disclosure. The vehicular antenna device 10 is a device that is attached to a roof at an upper surface of a vehicle (not illustrated) and includes an antenna base 20, metal bases 21 and 22, a case 23, patch antennas 30 and 31, and an antenna 32.

In FIG. 1, an x direction is a front-rear direction of a vehicle to which the vehicular antenna device 10 is to be attached, a y direction is a left-right direction perpendicular to the x direction, and a z direction is a vertical direction perpendicular to the x direction and the y direction. Further, a +x direction is a direction from a driver seat of the vehicle toward a front side, a +y direction is a direction therefrom toward a right side, and a +z direction is a zenith direction (up direction) therefrom. Hereinafter, in an embodiment of the present disclosure, descriptions are given assuming that front-rear, left-right, and up-down directions of the vehicular antenna device 10 are the same as the front-rear, left-right, and up-down directions of the vehicle, respectively.

The antenna base 20 is a plate-shaped member forming a bottom surface of the vehicular antenna device 10, and is, for example, formed of insulating resin. The metal bases 21 and 22, which are given in the order from the front side, is attached to the antenna base 20 with multiple screws (not illustrated). The metal base 21 is a plate-shaped member at which the patch antenna 30 is disposed, and the metal base 22 is a plate-shaped member at which the patch antenna 31 and the antenna 32 are disposed.

The metal base 21 and the metal base 22 are electrically connected to each other with a metal plate (not illustrated). Further, when the vehicular antenna device 10 is attached to the roof of the vehicle (not illustrated), the metal bases 21 and 22 and the roof are electrically connected to each other. Thus, the metal bases 21 and 22 function as a ground for the vehicular antenna device 10. Although the metal bases 21 and 22 are provided as separate bodies in an embodiment of the present disclosure, the metal bases 21 and 22 may be formed of a single metal base. Even when such a metal base is used, the metal base appropriately functions as a ground for the patch antennae 30 and 31.

Further, the antenna base 20 may include only the metal bases 21 and 22 or may include the metal bases 21 and 22 and an insulating base. The antenna base 20 may include the insulating base and a metal plate instead of the metal bases 21 and 22, or moreover, the antenna base 20 may include the insulating base, the metal bases 21 and 22, and the metal plate.

The patch antenna 30 is, for example, an antenna to receive radio waves in the 2.3 GHz band for a satellite digital audio radio service (SDARS: Satellite Digital Audio Radio Service). The patch antenna 31 is, for example, an antenna to receive radio waves in the 1.5 GHz band for a global navigation satellite system (GNSS: Global Navigation Satellite System). Details of the patch antenna 31 are described later.

The antenna 32 is, for example, an antenna to receive radio waves for AM/FM radio. Specifically, the antenna 32 receives radio waves of 522 kHz to 1710 kHz for the AM broadcast and radio waves of 76 MHz to 108 MHz for the FM broadcast, for example. The antenna 32 includes a helical element 80, a capacitively loaded element 100, and filters 110.

The helical element (hereinafter, simply referred to as "coil") 80 is provided at the metal base 22 in a state of being attached to a support-post-shaped holder (not illustrated). Then, one end of the coil 80 is electrically connected to the metal base 22, and the other end of the coil 80 is electrically connected to the capacitively loaded element 100. The capacitively loaded element 100 is an element to resonate with the coil 80 in a desired frequency band, and includes metal bodies 100*a* to 100*d* obtained by dividing the element into four along the front-rear direction (longitudinal direction).

Here, the term "metal body" indicates one formed by processing a metal member, and includes, for example, not only a plate-shaped metallic member such as a metallic plate and the like but also a metal member in a three dimensional shape other than the plate shape. Each of the metal bodies 100*a* to 100*d* of an embodiment of the present disclosure is formed by bending the metal plate at two end portions thereof in the y-axis direction upward from a bottom surface substantially parallel to a central x-y plane. Further, the filters 110 are provided in a clearance between the metal body 100*a* and the metal body 100*b* on a left side, a clearance between the metal body 100*b* and the metal body 100*c* on a right side, and a left clearance between the metal body 100*c* and the metal body 100*d* on the left side, respectively. The filters 110 are circuits, for example, to resonate in parallel in the frequency band of the patch antenna 31, and each include a capacitor and coil (not-illustrated). Thus, the filters 110 electrically couple the four metal bodies 100*a* to 100*d* with each other. The filters 110 have a high impedance in the frequency band of the patch antenna 31.

Although the filters 110 according to an embodiment of the present disclosure are provided at the positions illustrated in FIG. 1, the positions and the number of the filters 110 are not limited to the above, as long as the filters 110 are arranged at positions at which metal bodies immediately adjacent to each other in the metal bodies 100*a* to 100*d* are connected to each other. Thus, the filters 110 may be provided at, for example, an upper position including top portions of the metal bodies 100*a* to 100*d* or at a lower position including the bottom surfaces thereof. Further, the filters 110 may be arranged on only one side of the left side and the right side of the capacitively loaded element 100.

As such, the four metal bodies 100*a* to 100*d* are electrically connected to each other through the filters 110 having a high impedance in the frequency band of the patch antenna 31. The coil 80 is designed so as to have a high impedance in the frequency band of the patch antenna 31. The filters 110 have a low impedance in the frequency band of AM/FM, and thus the entire metal bodies 100*a* to 100*d* operate as a single conductor with the coil 80 in the frequency band of AM/FM. That is, the coil 80 and the capacitively loaded element 100 operate as an antenna to resonate in the frequency band of the AM/FM.

Although the capacitively loaded element 100 includes the four metal bodies 100*a* to 100*d* in an embodiment of the present disclosure, it is not limited thereto. For example, the capacitively loaded element 100 may be formed of a single metal body or multiple metal bodies. Further, although the capacitively loaded element 100 has a shape obtained by bending the central bottom surface upward at the two end portions thereof, the shape is not limited thereto. For example, the capacitively loaded element 100 may have a shape obtained by bending it downward at the two end portions thereof. Moreover, the capacitively loaded element 100 may have a shape of inverted V, inverted U, a mountain, or an arch, for example.

Further, although lengths of the four metal bodies 100*a* to 100*d* in the front-rear direction are the same in an embodiment of the present disclosure, it is not limited thereto. For example, the lengths of the four metal bodies 100*a* to 100*d* in the front-rear direction may be different from one another or may be partially the same. Moreover, although the metal bodies 100*a* to 100*d* each have a shape having the bottom surface, they may include a metal body having no bottom surface.

<<<Derails of Patch Antenna 31>>>

Figure 2:
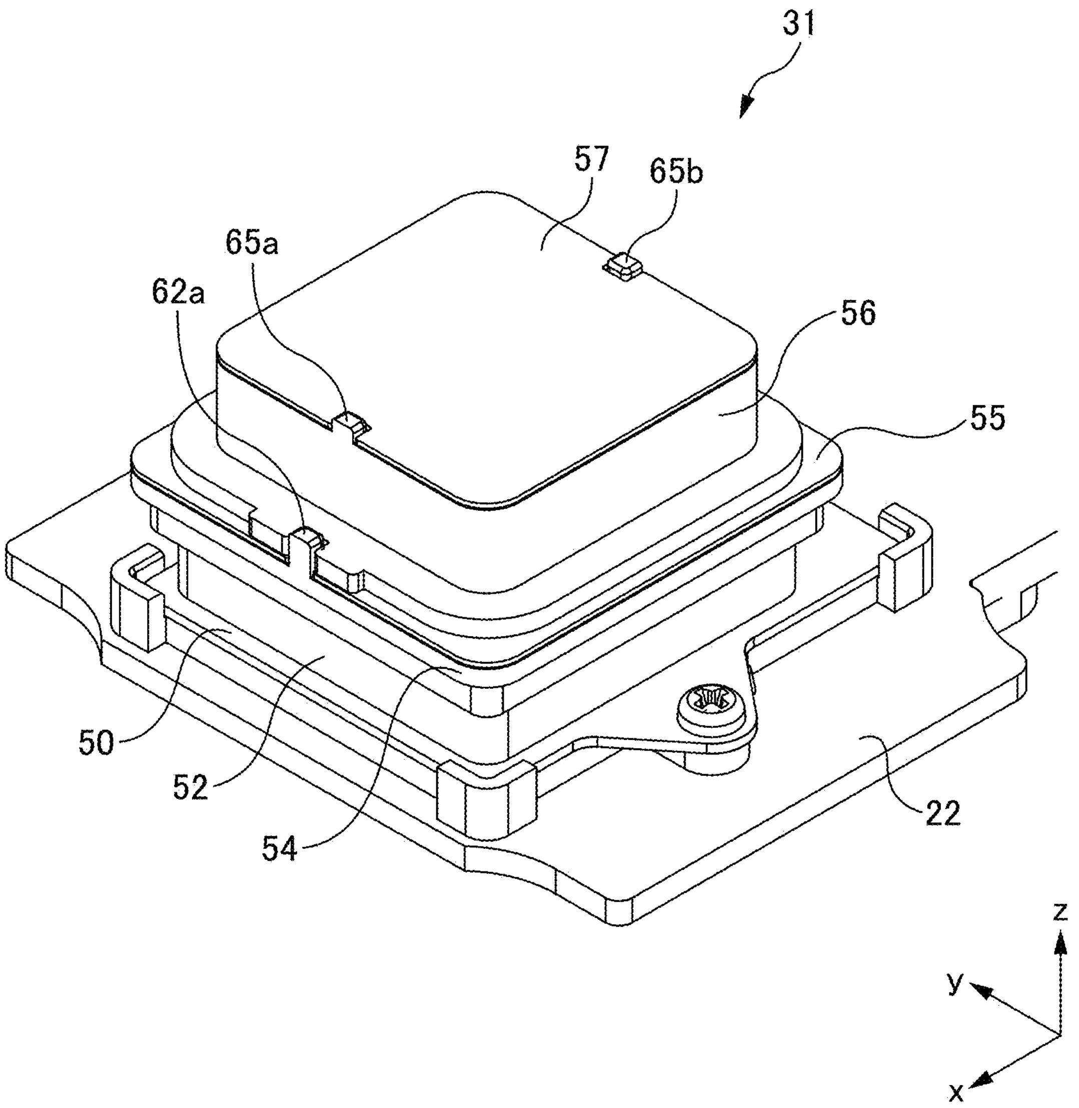
FIG. 2 is a diagram illustrating a patch antenna 31.
Figure 3:
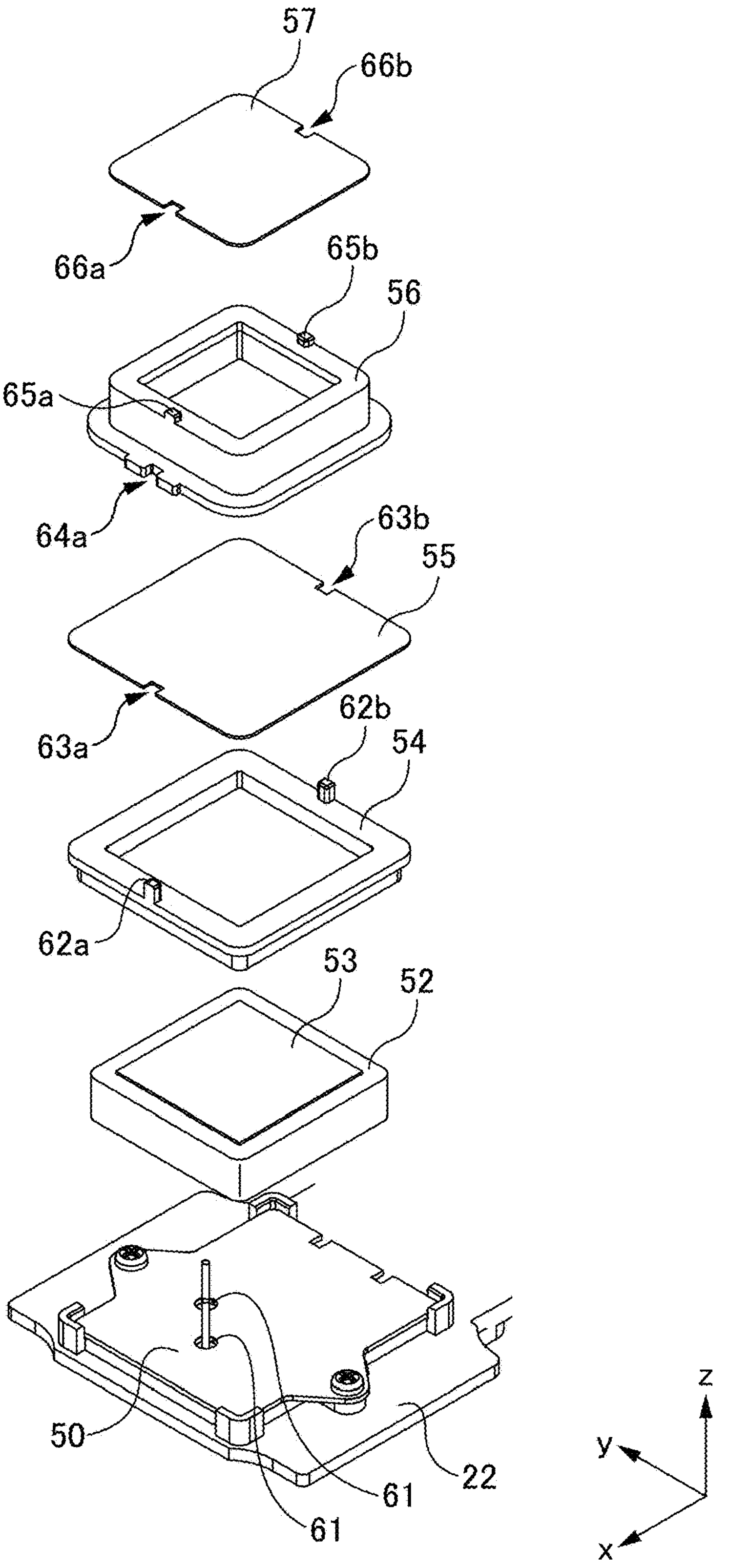
FIG. 3 is an exploded perspective view of the patch antenna 31.
Figure 4:
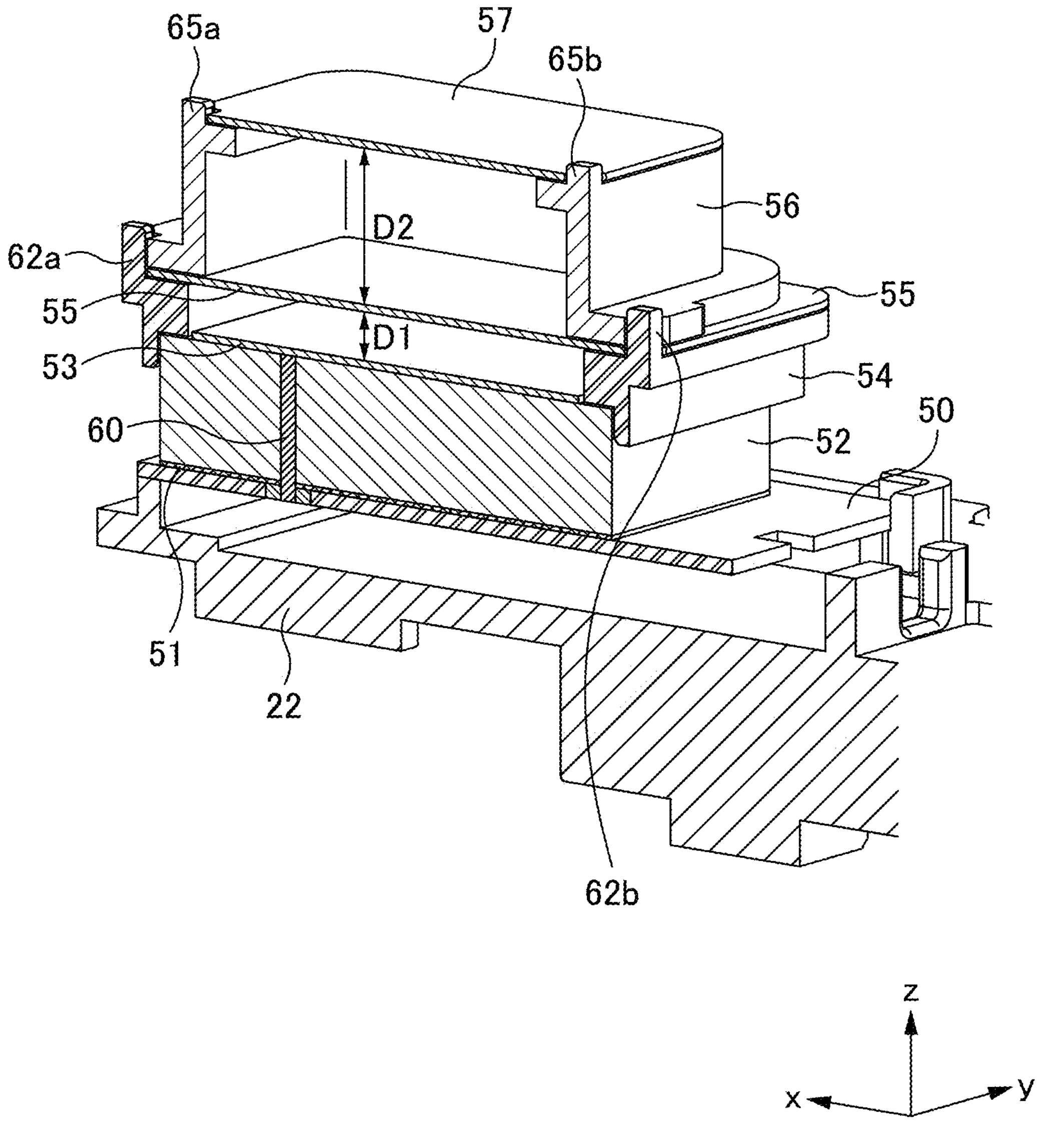
FIG. 4 is a cross-sectional perspective view of the patch antenna 31.

Here, the details of the patch antenna 31 is described with reference to FIGS. 2 to 4. FIG. 2 is a perspective view of the patch antenna 31, and FIG. 3 is an exploded perspective view of the patch antenna 31. Further, FIG. 4 is a cross-sectional perspective view of the patch antenna 31. As illustrated in FIGS. 3 and 4, the patch antenna 31 includes a substrate 50, a dielectric member 52 having a pattern 51 formed therein or thereon, a radiation element 53, holding members 54 and 56, and metal bodies 55 and 57.

The substrate 50 is a circuit board provided with the dielectric member 52 having the pattern 51 formed in its back surface. The pattern 51 in the back surface of the dielectric member 52 is a conductor that functions as a ground conductor film (or a ground conductor plate). The back surface of the dielectric member 52 is attached to the substrate 50 with an adhesive (not illustrated), for example. The dielectric member 52 is formed of a dielectric material such as ceramics, and is a member in a substantial square plate-shape or a box shape in plan view of the x-y plane viewed from the +z direction.

The conductive radiation element 53 in a shape of a substantial square with the equal lengths and widths is formed at a front surface of the dielectric member 52. Here, the term "substantial square" includes a shape in which at least a part of corners is cut out obliquely relative to a side and a shape in which a notch (recessed portion) or a protrusion (projecting portion) is provided to a part of a side.

The radiation element 53 has a shape of the substantial square including two feeding points as described later, however, the radiation element 53 may include one feeding point, for example. In this case, the radiation element 53 is in a shape of a substantial rectangle with different lengths and widths. As with the substantial square, the term "substantial rectangle" also includes a shape in which a corner thereof is cut out obliquely relative to a side, for example. Further, in an embodiment of the present disclosure, the substantial square and the substantial rectangle are collectively referred to as a substantial quadrangle as appropriate.

Further, in an embodiment of the present disclosure, as illustrated in FIG. 4, a through-hole 60 extending through the substrate 50 and the dielectric member 52 is formed. In FIG. 4, only one through-hole 60 is illustrated, however, in actuality, two through-holes 60 are formed in the substrate 50 and the dielectric member 52 such that two feed lines 61 are coupled at the feeding points of the radiation element 53, respectively.

The holding member 54 made of resin is provided at the front surface of the dielectric member 52 so as to surround the radiation element 53. The holding member 54 is a frame-shaped member to hold the metal body 55. Specifically, the holding member 54 includes an upper frame and a lower frame in a shape of the substantial square having an opening with a predetermined area in plan view.

A width of a side forming the upper frame of the holding member 54 is larger than a width of a side forming the lower frame. Further, in an embodiment of the present disclosure, a front surface of the upper frame of the holding member 54 having a larger width holds the metal body 55, and thus the metal body 55 is disposed at the holding member 54 in a stable state.

Moreover, protruding portions 62*a* and 62*b* extending in the z-axis direction are respectively formed near the centers of two sides, parallel to the y axis, of the upper frame of the holding member 54. Each of the protruding portions 62*a* and 62*b* is, for example, a protrusion in a substantially rectangular parallelepiped shape that is formed to determine a position of the metal body 55 with respect to the holding member 54.

The terms "center of a side" indicates, for example, a position at which a side on the +x side (or a side on the −x side), parallel to the y axis, of the upper frame of the holding member 54 and an axis in the x direction passing through the geometric center of the holding member 54 (hereinafter, simply referred to as "center") intersect each other.

The metal body 55 is a top plate (or a top capacitance plate) in a shape of the substantial square held by the holding member 54, and recessed portions 63*a* and 63*b* are respectively formed near the center of the side on the +x side and the center of the side on the −x side parallel to the y axis. In an embodiment of the present disclosure, the metal body 55 is arranged at a front surface of the holding member 54 in a state where the protruding portions 62*a* and 62*b* of the holding member 54 are fitted into the recessed portions 63*a* and 63*b* of the metal body 55, respectively.

Incidentally, as described above, the holding member 54 is a frame in a shape of the substantial square, and the metal body 55 is a plate-shaped member having a shape of the substantial square in plan view. Accordingly, when the metal body 55 is attached to the holding member 54 such that the protruding portions 62*a* and 62*b* are fitted into the recessed portions 63*a* and 63*b*, the center of the holding member 54 and the center of the metal body 55 substantially coincide.

The holding member 56 is a frame-shaped member made of resin, and is provided at a front surface of the metal body 55. Specifically, the holding member 56 includes an upper frame and a lower frame each in a shape of the substantial square having an opening with a predetermined area in plan view. Further, a width of a side forming the lower frame of the holding member 56 is larger than a width of a side forming the upper frame. Moreover, in an embodiment of the present disclosure, the front surface of the metal body 55 and a bottom surface of the lower frame of the holding member 56 having the larger width overlap each other. Accordingly, the holding member 56 is disposed at the metal body 55 in a stable state.

Recessed portions 64*a* and 64*b* are respectively formed near the centers of two sides, parallel to the y axis, of the lower frame of the holding member 56. In an embodiment of the present disclosure, the recessed portions 64*a* and 64*b* are designed such that the recessed portions 64*a* and 64*b* and the recessed portions 63*a* and 63*b* match, respectively, in plan view when the holding member 56 is provided at the front surface of the metal body 55. As a result, when the holding member 54, the metal body 55, and the holding member 56 are stacked, the recessed portions 63*a* and 64*a* are fitted into the protruding portion 62*a*, and the recessed portions 63*b* and 64*b* are fitted into the protruding portion 62*b*.

Further, protruding portions 65*a* and 65*b* are respectively formed near the centers of two sides, parallel to the y axis, of the upper frame of the holding member 56. As with the metal body 55, the metal body 57 is a plate-shaped member (top plate) in a shape of the substantial square in plan view, and recessed portions 66*a* and 66*b* are respectively formed near the center of a side on the +x side and the center of a side on the −x side parallel to the y axis. In an embodiment of the present disclosure, the metal body 57 is arranged at a front surface of the holding member 56 in a state where the protruding portions 65*a* and 65*b* of the holding member 56 are fitted in the recessed portions 66*a* and 66*b* of the metal body 57, respectively. Accordingly, the center of the holding member 56 and the center of the metal body 57 substantially coincide.

Incidentally, the holding member 54 according to an embodiment of the present disclosure is provided on the dielectric member 52 such that the center of the holding member 54 and the center of the radiation element 53 coincide. Accordingly, the holding member 54 holds the metal body 55 such that the center of the radiation element 53 and the center of the metal body 55 coincide.

Further, the holding member 56 is also provided on the metal body 55 such that the center of the holding member 56 and the center of the metal body 55 coincide. Accordingly, the holding member 56 results in holding the metal body 57 such that the center of the metal body 55 and the center of the metal body 57 coincide. In the patch antenna 31, since all the centers of the metal bodies 55 and 57 and radiation element 53 in a shape of the substantial square substantially coincide as described above, it is possible to further improve an axial ratio (AR:Axial Ratio). Further, in such a configuration, it is possible to downsize the patch antenna 31 more than, for example, a case where the centers of the radiation element 53 and the metal bodies 55 and 57 do not coincide.

The metal body 55 corresponds to a "first metal body" that is provided closest to the radiation element 53 in a direction perpendicular to an upper surface of the radiation element 53. Further, the metal body 57 corresponds to a "second metal body" provided closest to the metal body 55 in the direction perpendicular to the upper surface of the radiation element 53. Moreover, the metal bodies 55 and 57 correspond to "two metal bodies", the holding member 54 corresponds to a "first holding member", and the holding member 56 corresponds to a "second holding member".

Here, a distance D1 between the radiation element 53 and the metal body 55 is the minimum separation distance in a distance from a front surface of the radiation element 53 to the metal body 55 in the perpendicular direction (+z direction). In an embodiment of the present disclosure, the metal body 55 is a plate-shaped member, and has a surface facing the front surface of the radiation element 53. Thus, the distance D1 is a distance from the front surface of the radiation element 53 to a back surface of the metal body 55 that faces the radiation element 53.

Further, the metal body 57 is provided such that at least the metal body 57 and the metal body 55 face each other, in the perpendicular direction of the metal body 55 (+z direction) and in plan view. Moreover, in an embodiment of the present disclosure, a distance D2 between the metal body 55 and the metal body 57 is the minimum separation distance in a distance between facing portions of the metal body 55 and the metal body 57 in a distance between the metal body 55 and the metal body 57. A "portion" herein includes a part of a plane, an edge, and a side when the metal body is a plate-shaped member and a part of a surface, a curved surface, an edge, a side when the metal body is in a three dimensional shape provided with a recess and a protrusion. Thus, the distance between the metal body 55 and the metal body 57 is the minimum separation distance in the distance between the metal body 55 and the metal body 57 in the z-axis direction.

Here, since both the metal bodies 55 and 57 are plate-shaped members, the distance D2 is a distance from the front surface of the metal body 55 to a back surface of the metal body 57. Further, in the patch antenna 31, it is assumed, for example, that components, such as the dielectric member 52 and the holding member 54, are adhered to each other with a double-sided tape or an adhesive (not illustrated).

<<<Characteristics of Patch Antenna>>>

The two metal bodies 55 and 57 are provided above the radiation element 53 in the patch antenna 31, however, for comparison, a description is given of electric characteristics of a patch antenna in which the metal bodies 55 and 57 and the like are not provided (hereinafter, referred to as patch antenna X), for comparison. It is assumed that, hereinafter, unless stated otherwise, the patch antenna receives radio waves of right-handed circularly polarized wave in the L1 band (the center frequency of 1575.42 MHz) of the GNSS. Further, in an embodiment of the present disclosure, the terms "wavelength of a desired frequency band" indicates a wavelength corresponding to a desired frequency in a desired frequency band in which the patch antenna 31 is used. Specifically, the terms "wavelength of a desired frequency band" is, for example, a wavelength corresponding to the center frequency in a desired frequency band (hereinafter, referred to as an operating wavelength) and is expressed by $\lambda$. Moreover, hereinafter, for example, ½ of the operating wavelength is given $\lambda/2$ ($=(1/2)\times\lambda$).

==Size and the Like of Configuration of Patch Antenna==

The radiation element 53 is in a shape of the substantial square having a side of 28 mm (about $\lambda/8$). Moreover, the metal body 55 is in a shape of the substantial square having a side of 35 mm (about $\lambda/6$), and the metal body 57 is in a shape of the substantial square including a side of 27 mm (about $\lambda/8$). Furthermore, the distance D1 from the radiation element 53 to the metal body 55 is 3 mm (about $\lambda/80$), and the distance D2 from the metal body 55 to the metal body 57 is 8.5 mm (about $\lambda/23$). Hereinafter, in an embodiment of the present disclosure, conditions of the sizes of the radiation element 53 and the metal bodies 55 and 57 and the distances D1 and D2 described above are referred to as standard conditions.

==Characteristics of Patch Antenna X==

Figure 5:
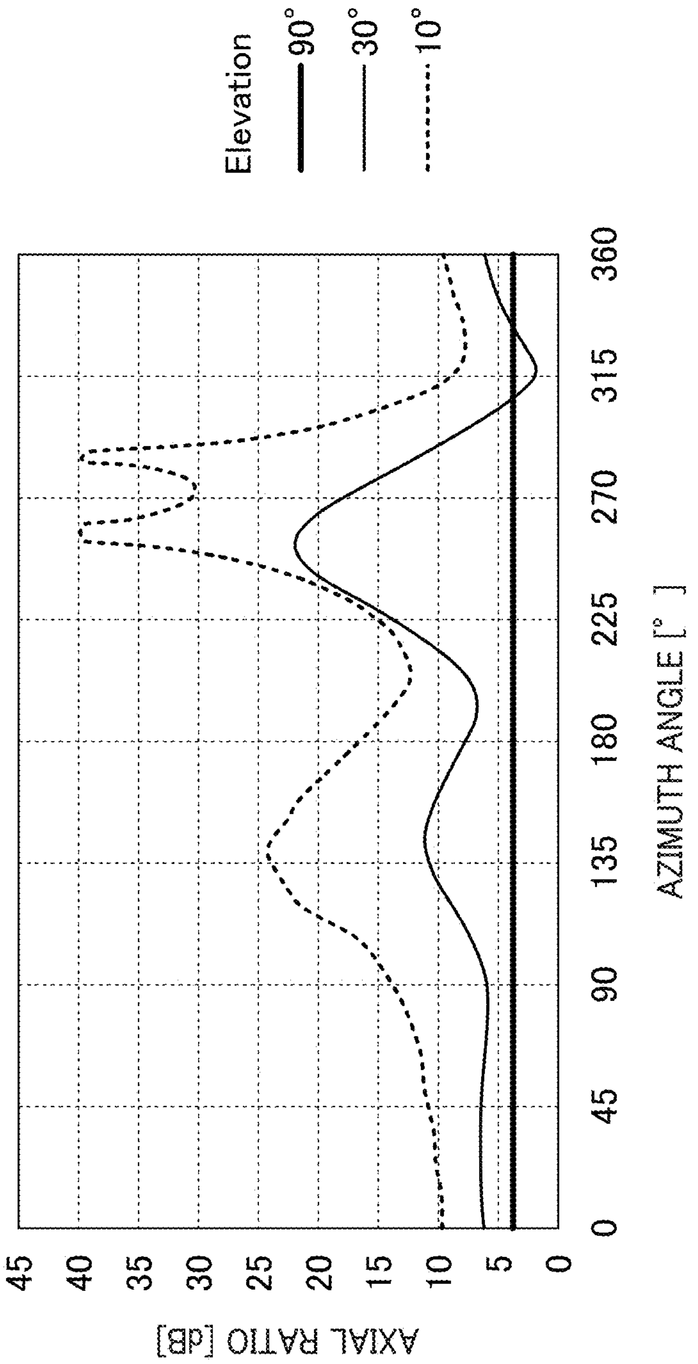
FIG. 5 is a chart illustrating characteristics of a patch antenna X.

Here, the patch antenna X (not illustrated), for example, includes the substrate 50, the pattern 51, the dielectric member 52, and the radiation element 53 illustrated in FIGS. 2 and 3 excluding the metal bodies 55 and 57. FIG. 5 is a chart illustrating axial ratio characteristics when the patch antenna X receives desired radio waves. Further, in FIG. 5, a +x-axis direction corresponds to an azimuth angle 180°, and a +y-axis direction corresponds to an azimuth angle 270°. As it can be seen from FIG. 5, as the elevation angle is lower, the axial ratio, particularly around the azimuth angles 135° and 270°, is degraded more.

==Characteristics of Patch Antenna 31==

Figure 6:
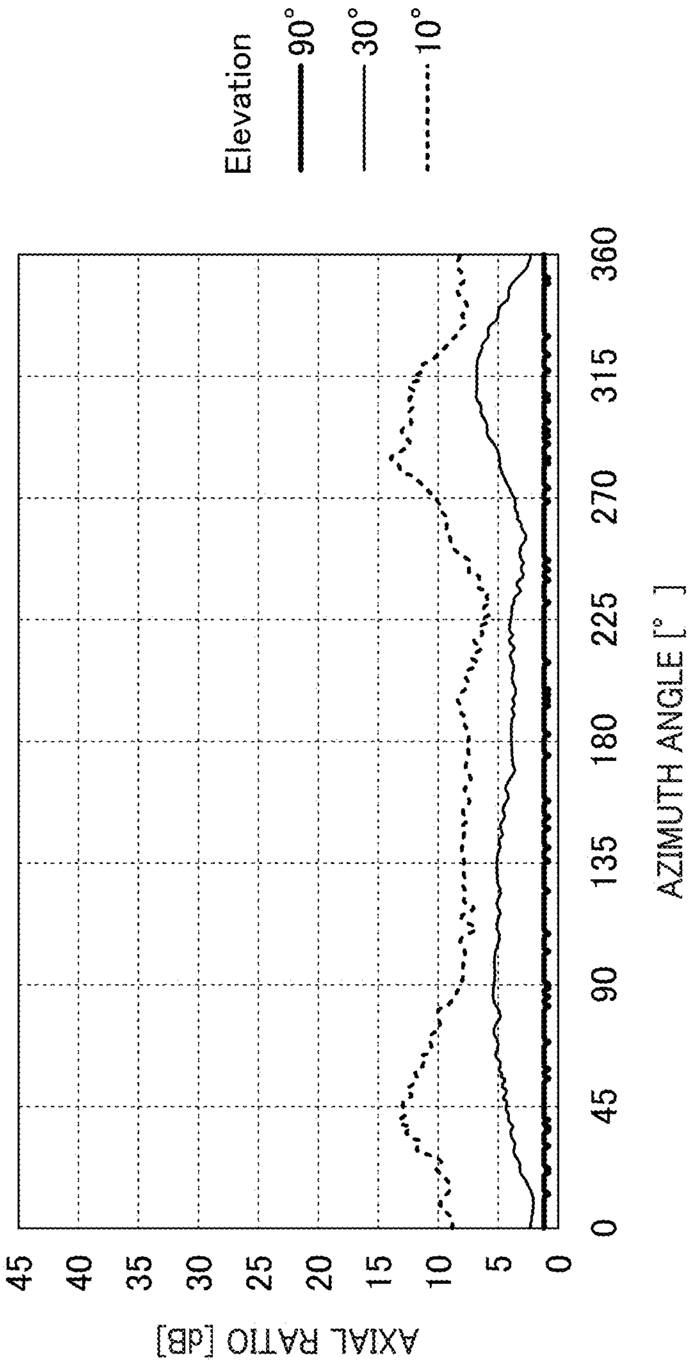
FIG. 6 is a chart illustrating characteristics of the patch antenna 31.

FIG. 6 is a chart illustrating axial ratio characteristics when the patch antenna 31 receives desired radio waves. When the axial ratio of the patch antenna X and the axial ratio of the patch antenna 31 are compared, it can be seen in the patch antenna 31 that a value of the axial ratio is reduced, to thereby improve the axial ratio, particularly at a low elevation angle (10° to 30°). Accordingly, as illustrated in FIG. 6, in the patch antenna 31, it is possible to improve the axial ratio of the low elevation angle by providing the metal bodies 55 and 57.

<<<When Components of Patch Antenna 31 are Changed>>>

As described above, the patch antenna 31 including the metal bodies 55 and 57 can improve the axial ratio. The patch antenna 31 employs the standard conditions that the size of the metal body 55 is 35 mm square, the size of the metal body 57 is 27 mm square, the distance D1 is 3 mm, and the distance D2 is 8.5 mm, however, those four elements may be changed. A case where each of the distances D1 and D2 is changed and a case where each of the sizes of the metal bodies 55 and 57 are changed are sequentially described below.

==When Distance D1 is Changed==

Figure 7:
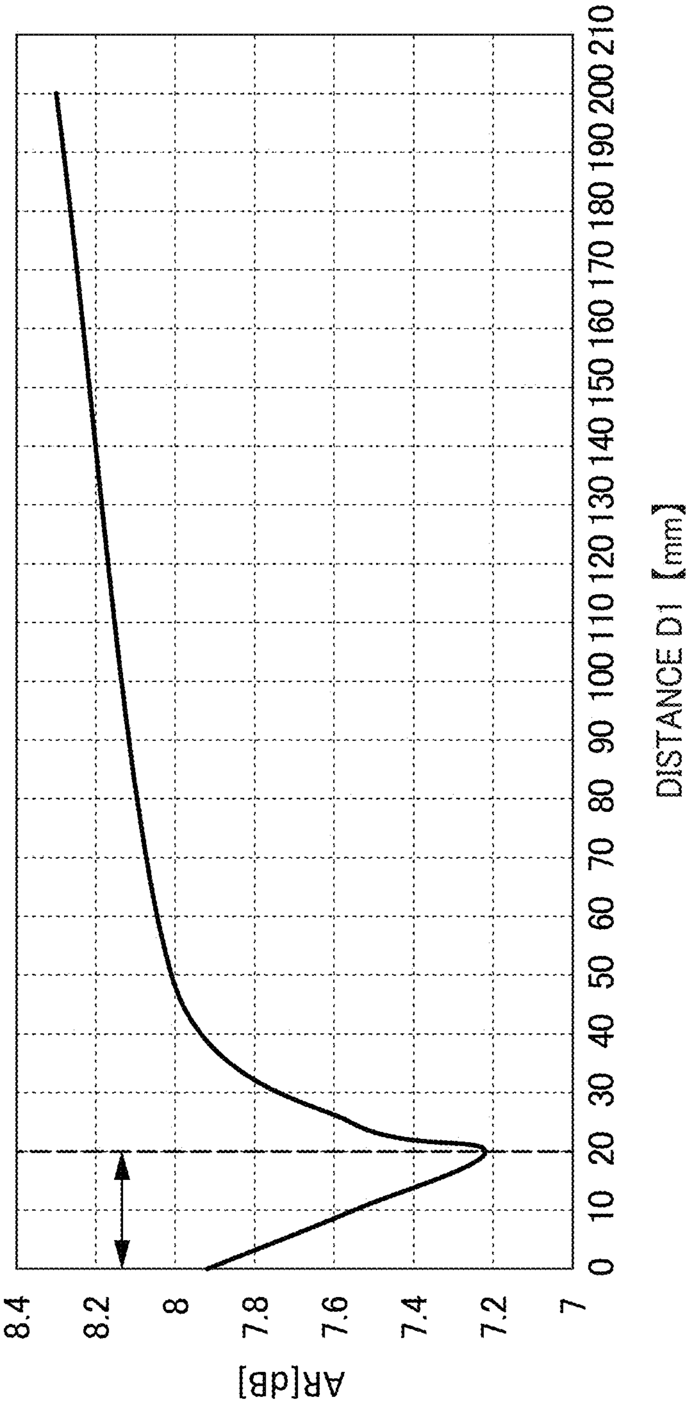
FIG. 7 is a chart illustrating a relationship between a distance D1 and an axial ratio.

FIG. 7 is a chart illustrating a relationship between the distance D1 and the axial ratio. A value of the axial ratio in FIG. 7 is the maximum value (worst value) of the azimuth angles 0 to 360° at the elevation angle 30°. Here, the standard conditions are employed as to the elements other than the distance D1. As can be seen from FIG. 7, when the distance D1 is changed from 0 mm to 20 mm ($\lambda/10$), the axial ratio gradually decreases from 7.92 dB, and when the distance D1 reaches 20 mm, the axial ratio reaches the minimum value (7.22 dB). Then, when the distance D1 increases from 20 mm, the axial ratio increases from the minimum value. Accordingly, in the patch antenna 31, it is possible to improve the axial ratio by setting the distance D1 in a range from 0 mm to 20 mm ($\lambda/10$).

==When Distance D2 is Changed==

Figure 8:
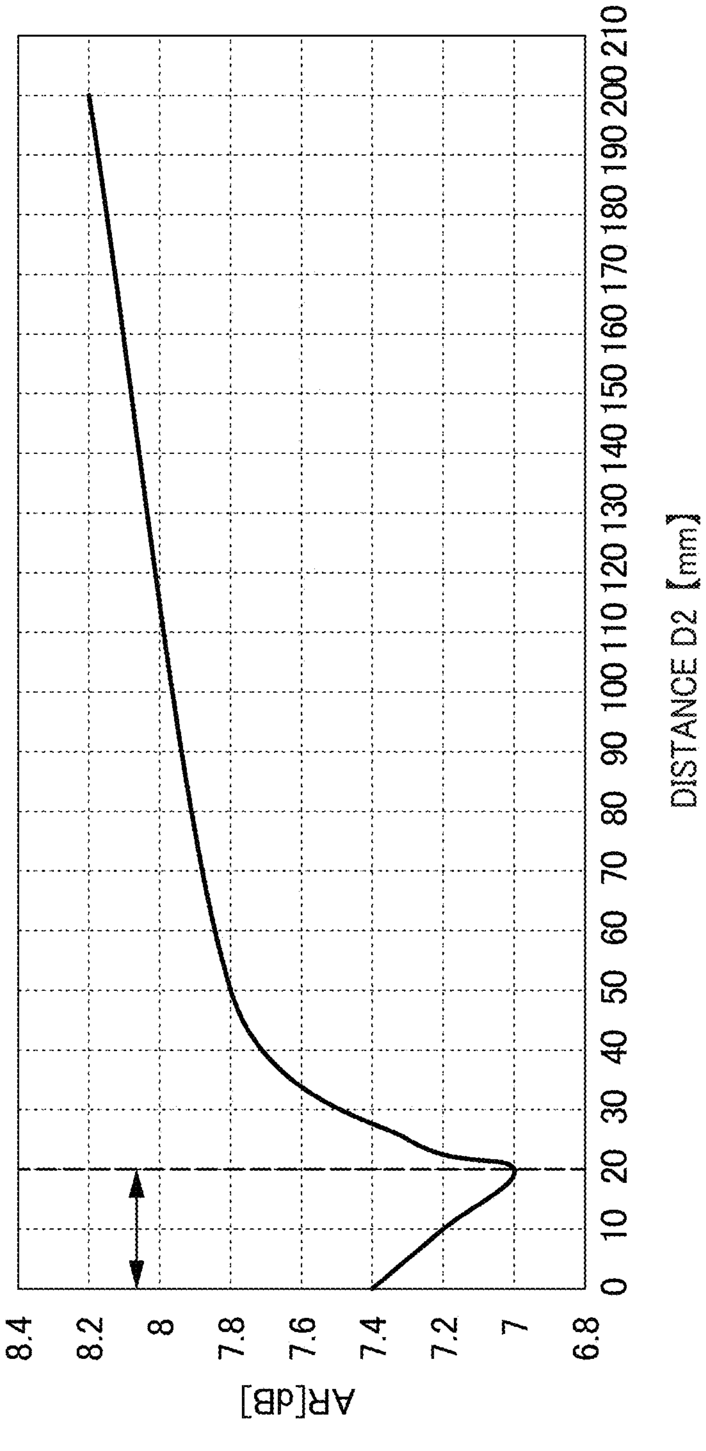
FIG. 8 is a chart illustrating a relationship between a distance D2 and an axial ratio.

FIG. 8 is a chart illustrating a relationship between the distance D2 and the axial ratio. The axial ratio in FIG. 8 is also the same as in FIG. 7, and the standard conditions are employed as to the elements other than the distance D2 herein. As can be seen from FIG. 8, when the distance D2 is changed from 0 mm to 20 mm ($\lambda/10$), the axial ratio gradually decreases from 7.4 dB, and when the distance D2 reaches 20 mm, the axial ratio reaches the minimum value (7.0 dB). Then, when the distance D2 increases from 20 mm, the axial ratio increases from the minimum value. Accordingly, in the patch antenna 31, it is possible to improve the axial ratio by setting the distance D2 in a range from 0 mm to 20 mm ($\lambda/10$).

Although it is preferable that each of the distances D1 and D2 is set in the range from 0 mm to 20 mm ($\lambda/10$), this is a range in which the components are capacitively coupled to each other so as to improve the characteristics of the patch antenna 31. In other words, in an embodiment of the present disclosure, the radiation element 53 and the metal body 55 are capacitively coupled to each other and the metal body 55 and the metal body 57 are capacitively coupled to each other, to thereby improve the axial ratio of the patch antenna 31.

==When Size of Metal Body 55 is Changed==

Figure 9:
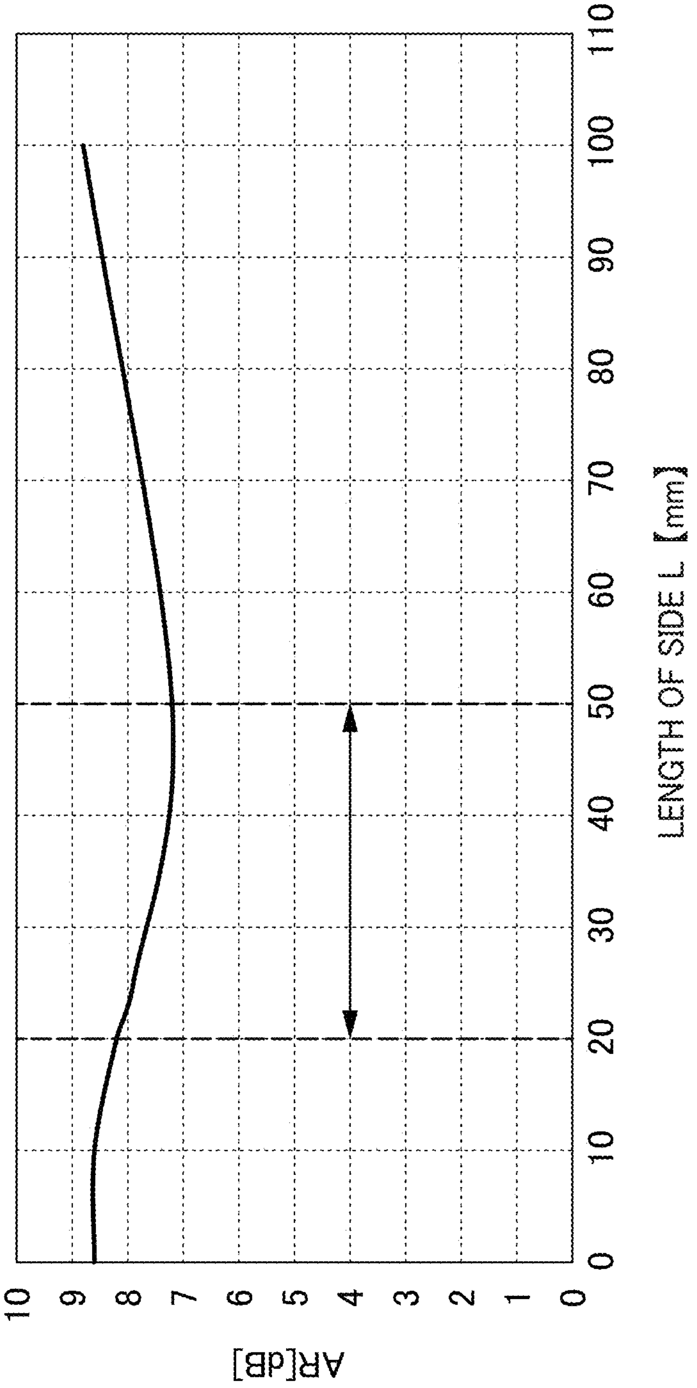
FIG. 9 is a chart illustrating a relationship between a length L of a side of a metal body 55 and an axial ratio.

FIG. 9 is a chart illustrating a relationship between the size of the metal body 55 and the axial ratio. The axial ratio in FIG. 9 is also the same as in FIG. 7, and the standard conditions are employed as to the elements other than the size of the metal body 55 herein. Further, the metal body 55 is in a shape of the substantial square, and thus the size of the metal body 55 is represented by a length of a side of the substantial square (hereinafter, referred to as length L). As can be seen from FIG. 9, when the length L is 0 mm, the axial ratio is 8.6 dB, meanwhile, when the length L reaches 20 mm ($\lambda/10$), the axial ratio decreases to 8.2 dB. Then, when the length L is 50 mm ($\lambda/4$), the axial ratio reaches the minimum value (7.2 dB).

Further, when the length L increases from 50 mm, the axial ratio increases from the minimum value. Accordingly, in the patch antenna 31, it is possible to improve the axial ratio, by setting the length L of the metal body 55 that is closest to the radiation element 53 of the patch antenna 31, to a length in a range from 20 mm ($\lambda/10$) to 50 mm ($\lambda/4$).

==When Size of Metal Body 57 is Changed==

Figure 10:
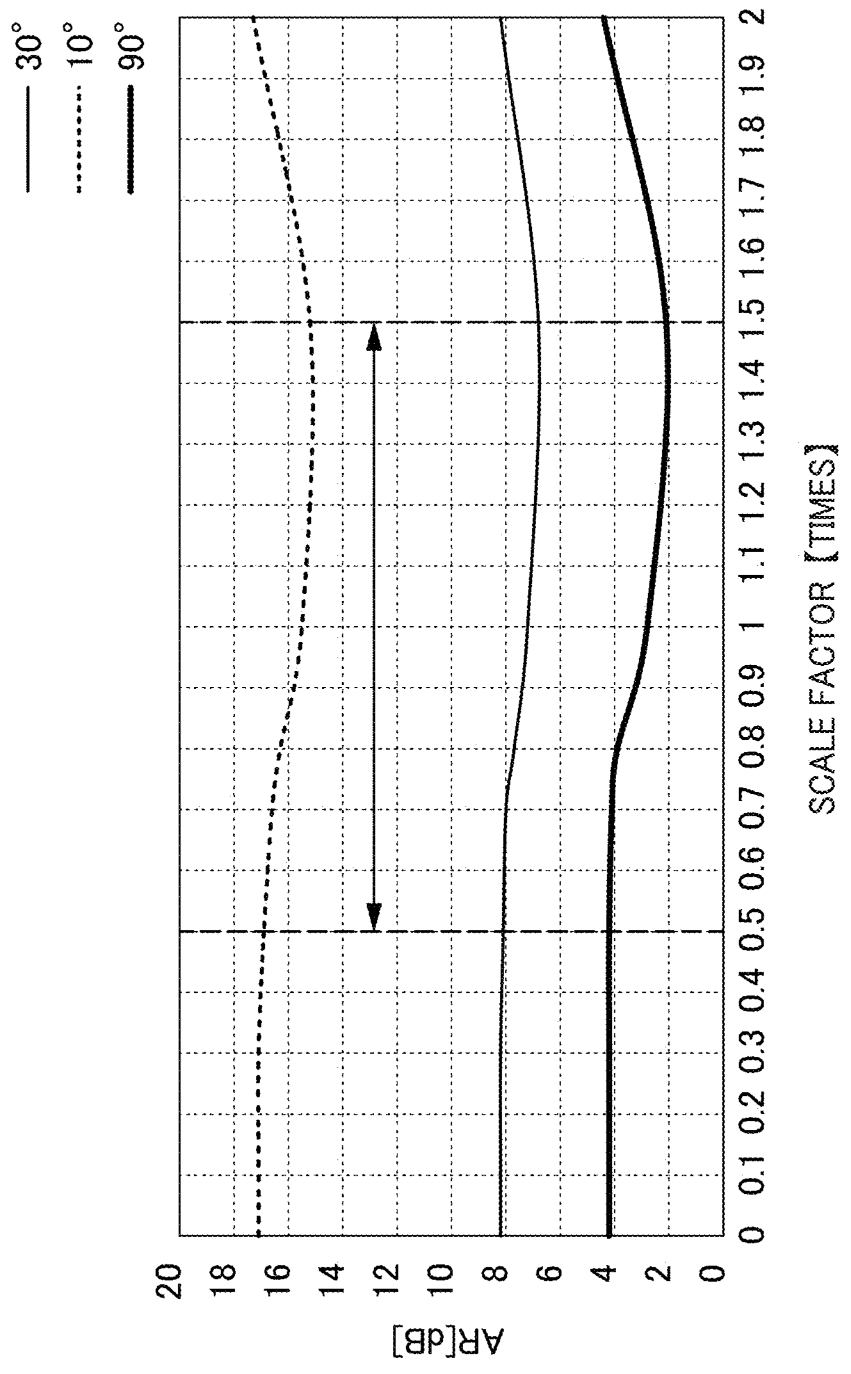
FIG. 10 is a chart illustrating a relationship between a scale factor of metal bodies 55 and 57 and an axial ratio.

FIG. 10 is a chart illustrating a relationship between the axial ratio and a size ratio between the metal body 55 and the metal body 57. In FIG. 10, the maximum value (worst value) of the azimuth angles $\theta$ to 360° at each of the elevation angles 10°, 30°, and 90° is given as the axial ratio. Further, the standard conditions are employed as to the elements other than the size of the metal body 57 herein. Moreover, a scale factor illustrated in FIG. 10 is a numerical value of the area of the metal body 57 in a shape of the substantial square, when the area of the metal body 55 in a shape of the substantial square is 1.0. Accordingly, for example, when the area of the metal body 57 is half the area of the metal body 55, the scale factor is 0.5.

In a case of the axial ratio of the elevation angle of 30° in FIG. 10, when the scale factor is greater than 0 and smaller than 0.5, the axial ratio is 8.2 dB without changing; however, when the scale factor is 0.5, the axial ratio decreases to 8.1 dB. Then, when the scale factor increases from 0.5, the axial ratio gradually decreases. Then, when the scale factor is 1.5 times, the axial ratio decreases the most and reaches the minimum value (6.8 dB).

Further, when the scale factor is increased greater than 1.5 times, the axial ratio increases from the minimum value. Accordingly, in the patch antenna 31, it is possible to improve the axial ratio by setting the scale factor to any value within a range of from 0.5 to 1.5.

Moreover, in a case where the elevation angle is 10°, the axial ratio greatly decreases particularly when the scale factor is in a range of from 0.5 to 1.0, and in a case where the elevation angle is 90°, the axial ratio greatly decreases particularly when the scale factor is in a range of from 1.0 to 1.5. Accordingly, in an embodiment of the present disclosure, it is possible to improve the axial ratio of particularly from a low elevation angle to a medium elevation angle (e.g., 10° to 30°) in a range of the scale factor from 0.5 to 1.0. Further, it is possible to improve the axial ratio of particularly from a medium elevation angle to a high elevation angle (e.g., 30° to 90°) in a range of the scale factor of from 1.0 to 1.5. Accordingly, in an embodiment of the present disclosure, it is possible to adjust the axial ratio of a desired elevation angle by adjusting the scale factor.

Vehicular Antenna Device 11 of Second Embodiment

Figure 11:
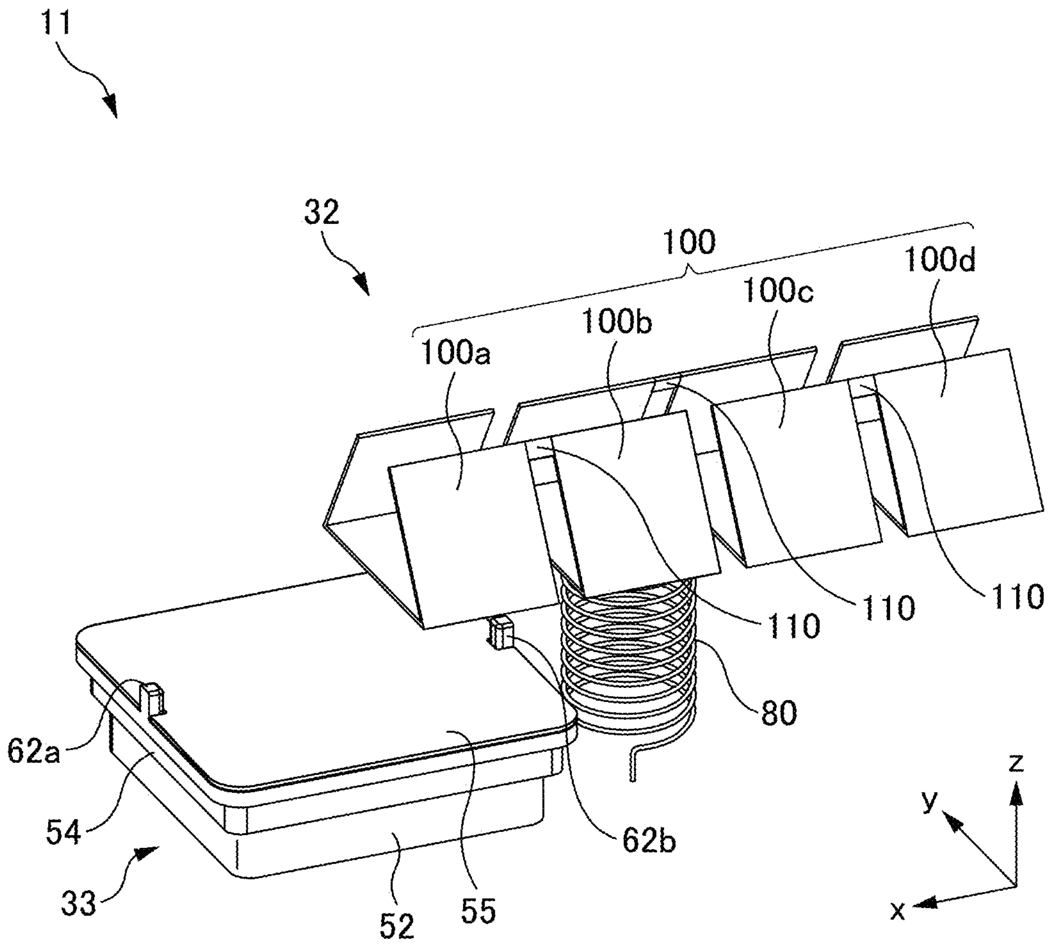
FIG. 11 is a schematic view illustrating a vehicular antenna device 11 of a second embodiment.
Figure 12:
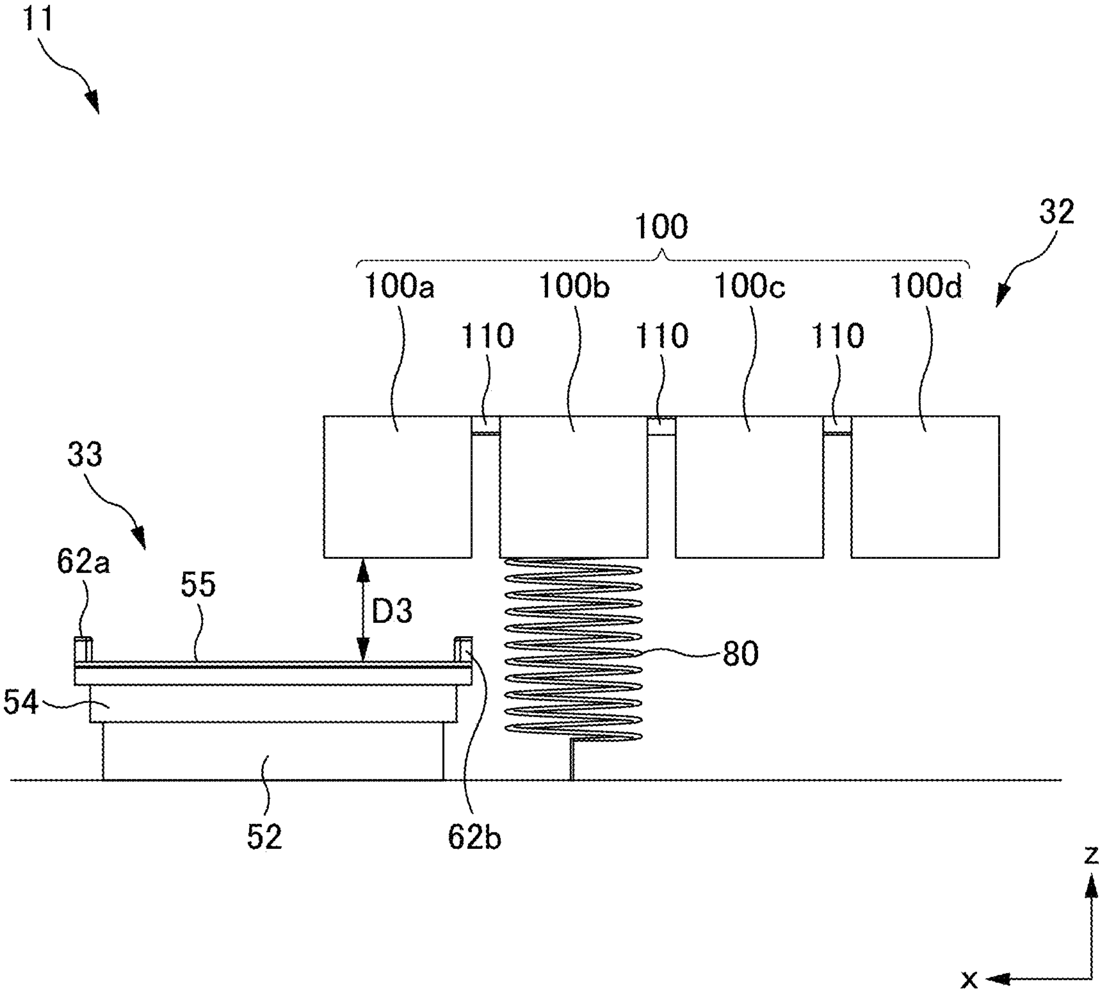
FIG. 12 is a schematic view illustrating the vehicular antenna device 11 of the second embodiment.

FIG. 11 is a schematic perspective view of a vehicular antenna device 11 of a second embodiment, and FIG. 12 is a schematic side view of the vehicular antenna device 11. The vehicular antenna device 11 is similar to the vehicular antenna device 10 in FIG. 1, and here, for the sake of convenience, only a partial configuration is illustrated and other configurations are omitted. The components given the same reference signs between the vehicular antenna device 10 and the vehicular antenna device 11 are the same.

In the vehicular antenna device 11, a patch antenna 33 is provided in place of the patch antenna 31. The patch antenna 33 is an antenna obtained by removing the holding member 56 and the metal body 57 from the patch antenna 31. That is, in the patch antenna 33, only the holding member 54 and the metal body 55 are provided above the radiation element 53.

Further, in the vehicular antenna device 11, the antenna 32 is attached to the antenna base 20 (not illustrated) such that a bottom surface of the metal body 100*a* of the antenna 32 is disposed at a position away from the front surface of the metal body 55 by a distance D3. Similarly to the above-described distance D2, the distance D3 is the minimum separation distance in a distance between facing portions of the metal body 55 and the metal body 100*a*.

In an embodiment of the present disclosure, the distance D3 from the metal body 55 to the bottom surface of the metal body 100*a* is set to a distance at which the metal body 55 and the metal body 100*a* are capacitively coupled to each other (e.g., within $\lambda/10$).

Although the size of the antenna 32 including the metal body 100*a* is illustrated slightly smaller herein for the sake of convenience, the actual area of the bottom surface of the metal body 100*a* facing the metal body 55 is at least 0.5 times or greater the area of the metal body 55. With such a configuration, it is possible to improve the axial ratio of the low elevation angle of the patch antenna 33 in the vehicular antenna device 11. Here, the metal body 100*a*, which is a part of the antenna 32, corresponds to a "second metal body".

Although the capacitively loaded element 100 in the vehicular antenna device 11 includes the four metal bodies 100*a* to 100*d* having the bottom surfaces substantially parallel to the x-y plane, it is not limited thereto. For example, each of the metal bodies 100*a* to 100*d* may have a shape of an umbrella protruding upward. Even in such a case, the distance D3 (the above-described minimum separation distance) between the radiation element 53 and the metal body 100*a* may be set to a distance at which the radiation element 53 and the metal body 100*a* can be capacitively coupled to each other (e.g., within $\lambda/10$).

Further, in the metal body 100*a*, it is possible to further improve the axial ratio by setting the area of a surface facing the radiation element 53 to at least 0.5 times or greater the area of the radiation element 53. Here, the terms the "surface facing the radiation element 53 in the metal body" is not necessarily a surface parallel to the x-y plane, but may be a surface including a curved surface and a recess and a protrusion.

Vehicular Antenna Device 12 of Third Embodiment

Figure 13:
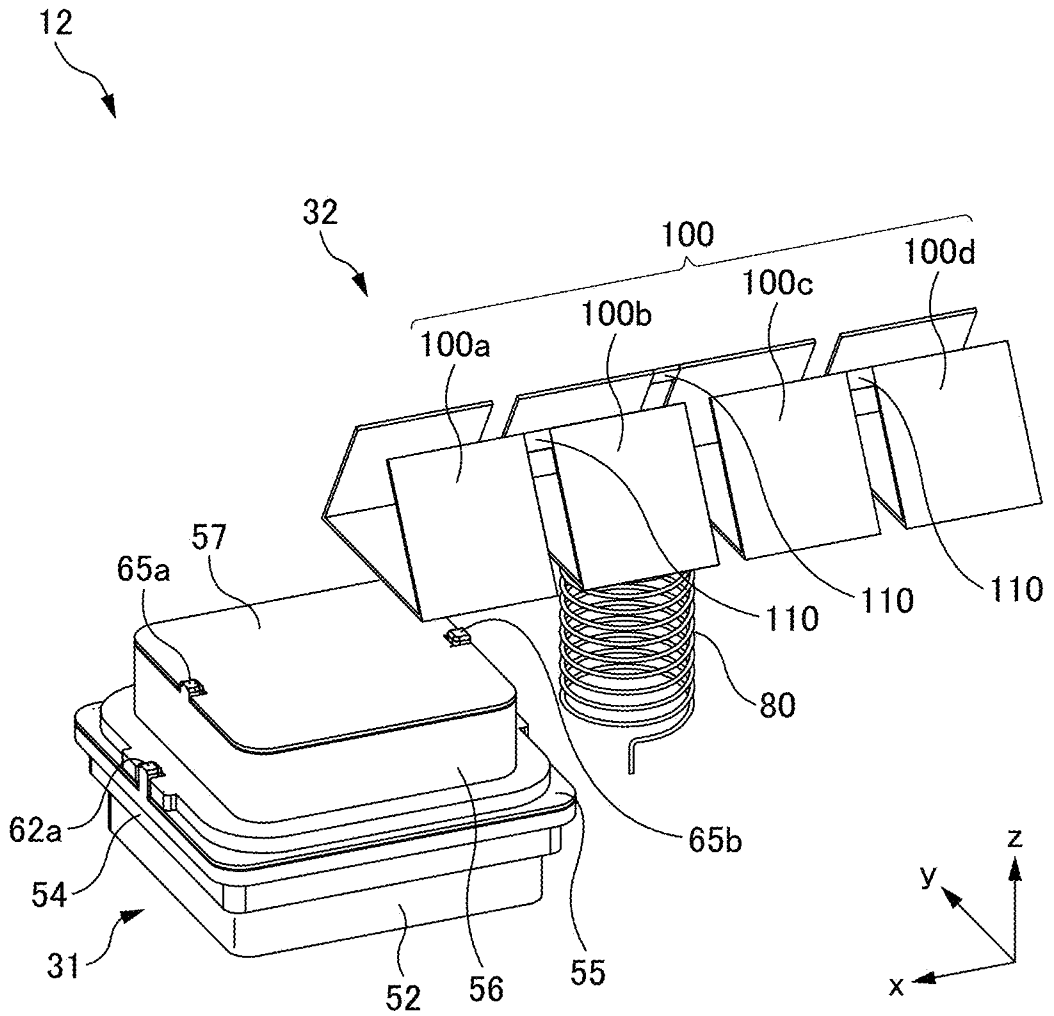
FIG. 13 is a schematic view illustrating a vehicular antenna device 12 of a third embodiment.
Figure 14:
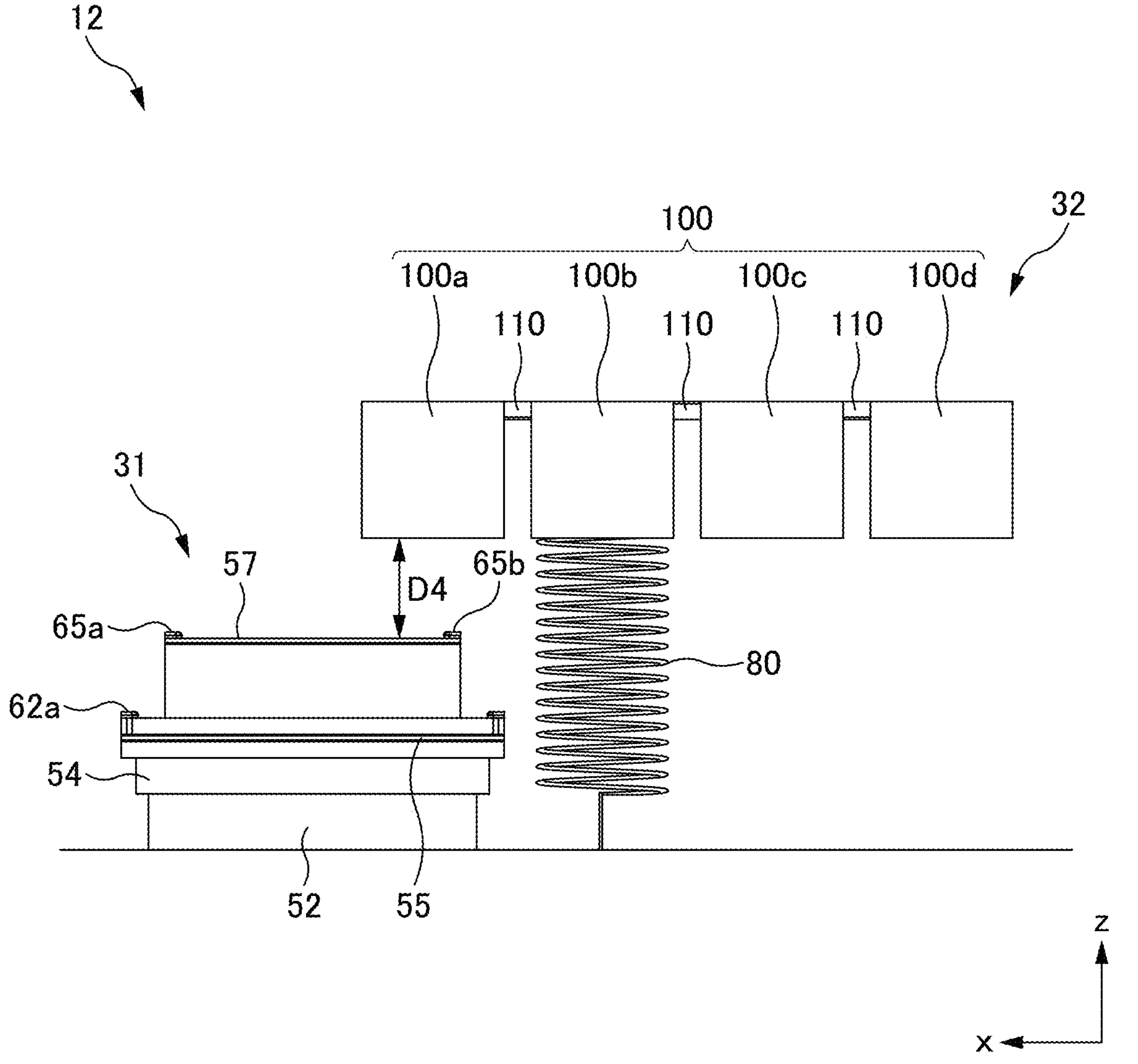
FIG. 14 is a schematic view illustrating the vehicular antenna device 12 of the third embodiment.

FIG. 13 is a schematic perspective view of a vehicular antenna device 12 of a third embodiment, and FIG. 14 is a schematic side view of the vehicular antenna device 12. The vehicular antenna device 12 is similar to the vehicular antenna device 10 in FIG. 1, and here, for the sake of convenience, only a partial configuration is illustrated, and other configurations are omitted. The components given the same reference signs between the vehicular antenna device 10 and the vehicular antenna device 12 are the same.

The vehicular antenna device 12 includes the patch antenna 31 and the antenna 32, as in the vehicular antenna device 10, however, the antenna 32 is provided above the patch antenna 31. Specifically, the antenna 32 is attached to the antenna base 20 (not illustrated) such that the bottom surface of the metal body 100*a* of the antenna 32 is disposed at a position away from a front surface of the metal body 57 of the patch antenna 31 by a distance D4. Similarly to the above-described distance D2, the distance D4 is the minimum separation distance in a distance between facing portions of the metal body 57 and the metal body 100*a*.

Here, in an embodiment of the present disclosure, the distance D4 from the metal body 57 to the bottom surface of the metal body 100*a* is set to a distance at which the metal body 57 and the metal body 100*a* are capacitively coupled to each other (e.g., within $\lambda/10$). With such a configuration, it is possible to improve the axial ratio of a low elevation angle of the patch antenna 31 of the vehicular antenna device 12. Here, the metal body 100*a*, which is a part of the antenna 32, corresponds to a "third metal body".

<<<Others>>>

==Radiation Element 53==

In the patch antenna 31, the radiation element 53 is in a shape of the substantial square, however, it is not limited thereto, and may be in a shape of, for example, a circle, an oval, and a substantial polygon other than a substantial quadrangle including the substantial square and the substantial rectangle. Even when a radiation element having such a shape is used, it is possible to improve the axial ratio of a low elevation angle of a patch antenna, as in an embodiment of the present disclosure.

==Holding Members 54 and 56==

Further, the holding members 54 and 56 are frame-shaped members, however, any shapes may be applicable as long as they can hold the metal bodies 55 and 57, respectively, so as to be positioned at desired positions (e.g., support posts to support four corners of the metal bodies). Moreover, for example, the metal bodies 55 and 57 may be held by using a solid base formed of resin, for example, as a holding member.

Furthermore, the metal bodies 55 and 57 may be positioned at desired positions by attaching the metal bodies 55 and 57 to a part of the inside of the case 23. In such a case, the case 23 corresponds to a "holding member".

==Positions of Radiation Element 53 and Metal Bodies 55 and 57==

Further, in the patch antenna 31, the metal body 55 is held such that the center of the radiation element 53 and the center of the metal body 55 coincide. However, it is possible to improve the axial ratio of a low elevation angle of the patch antenna 31 even when the centers of the radiation element 53 and the metal body 55 do not coincide.

Moreover, in the patch antenna 31, the metal body 57 is held such that the center of the metal body 55 and the center of the metal body 57 coincide. However, it is possible to improve the axial ratio of a low elevation angle of the patch antenna 31 even when the centers of the metal body 55 and the metal body 57 do not coincide.

==Metal Bodies 55 and 57==

Although the metal bodies 55 and 57 are in a shape of the substantial square, it is not limited thereto, and may be, for example, a circle, an oval, and a substantial polygon other than a substantial quadrangle. Even when the metal bodies 55 and 57 in such a shape is used, it is possible to improve the axial ratio of a low elevation angle of the patch antenna 31, as in an embodiment of the present disclosure.

Further, in an embodiment of the present disclosure, the metal bodies 55 and 57 are plate-shaped members parallel to the x-y plane, however, for example, at least a part thereof may be bent to have a protrusion shape and/or a recess shape. Moreover, the metal bodies 55 and 57 may have, for example, an asymmetrical shape, left and right.

FIGS. 15A to 15D are diagrams illustrating other embodiments of a metal body. In a metal body 200 illustrated in FIG. 15A, a metal plate is bent, at two end portions thereof in the y-axis direction, downward from the central portion to have a shape protruding in the +z-axis direction. In a metal body 201 illustrated in FIG. 15B, a metal plate is curved into an arch shape to have a shape protruding in the +z-axis direction.

Figure 15A:
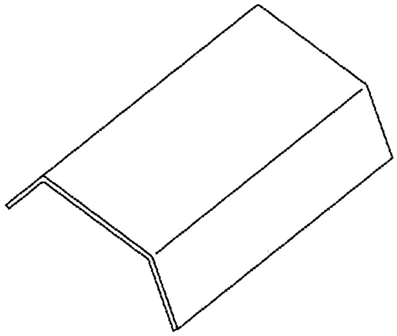
FIGS. 15A to 15D are diagrams illustrating other embodiments of a metal body.
Figure 15B:
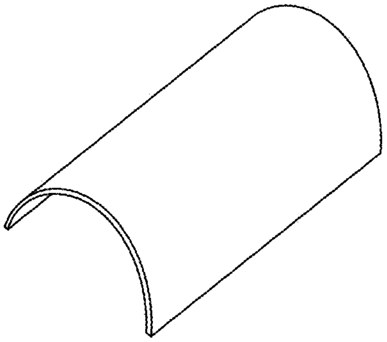
Figure 15C:
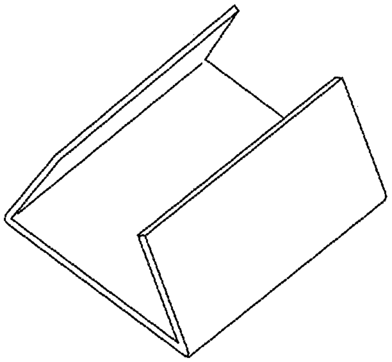
Figure 15D:
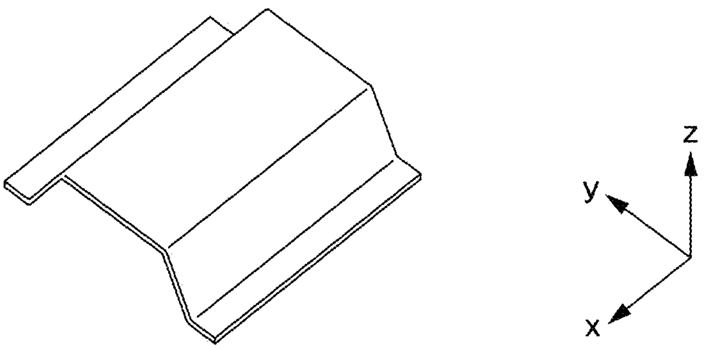

In a metal body 202 illustrated in FIG. 15C, a metal plate is bent, at two end portions thereof in the y-axis direction, upward from the central portion to have a shape protruding in the +axis direction. In a metal body 203 illustrated in FIG. 15D, a metal plate is bent, at two end portions thereof in the y-axis direction, downward from the central portion to form bent portions, and then, end portions of the bent portions are bent to form flanges, respectively. The central portion and the two flanges at the end portions formed in the metal body 203 are both substantially parallel to the x-y plane.

Even when such a metal body is used, the distance between the radiation element 53 and the metal body is determined by the distance D1, and the distance between the metal bodies is determined by the distance D2, as described above.

==Stacked Patch Antenna==

In an embodiment of the present disclosure, the patch antenna 31 includes only one dielectric member 52 and only one radiation element 53, however, it is not limited thereto. For example, assuming that the dielectric member 52 is a first dielectric member and the radiation element 53 provided to a front surface of the first dielectric member is a first radiation element, the patch antenna 31 may include a second dielectric member provided above the first radiation element and a second radiation element provided at a front surface of the second dielectric member. Alternatively, the patch antenna 31 may include the dielectric member 52 and another dielectric member that is provided at the front surface of the dielectric member 52 and that includes radiation elements at a front surface and a back surface thereof may be applicable. That is, the numbers of the dielectric members and the radiation elements are not limited to one and may be two or more, and the patch antenna 31 may have a stacked or multi-layered configuration.

Further, in the stacked configuration including the first and second dielectric members and the first and second radiation elements, the multiple metal bodies 55 and 57 described in an embodiment of the present disclosure may be provided above the uppermost second radiation element. In such a case, a configuration including the first and second dielectric members, the first and second radiation elements, and the multiple metal bodies 55 and 57 corresponds to a stacked patch antenna.

In the stacked patch antenna, the first radiation element and the second radiation element may be operated in frequency bands different from each other. As such, it is possible to obtain effect similar to that in an embodiment of the present disclosure, even in a case of the stacked patch antenna including multiple numbers of the dielectric members and the radiation elements.

Figure 16A:
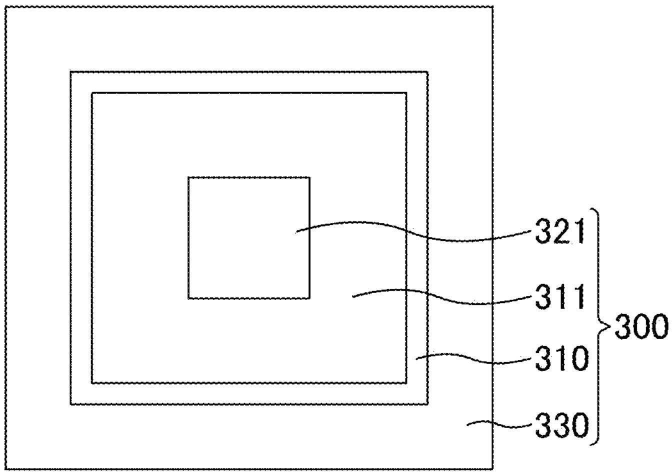
FIGS. 16A and 16B are diagrams illustrating an example of a main body portion 300 of a patch antenna.
Figure 16B:
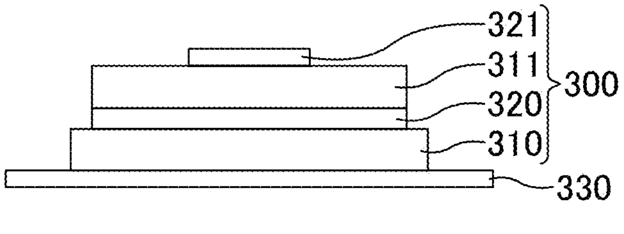

FIGS. 16A and 16B are diagrams illustrating an example of a main body portion 300 of the stacked patch antenna. The stacked patch antenna is, for example, an antenna supporting radio waves in two different frequency bands for the GNSS (e.g., radio waves in the L1 and L2 bands).

The main body portion 300 includes dielectric members 310 and 311 and radiation elements 320 and 321, as illustrated in plan view of FIG. 16A and a side view of FIG. 16B.

The dielectric member 310 is, for example, a member similar to the dielectric member 52 of the patch antenna 31 in FIG. 3, and is disposed at a substrate 330. The substrate 330 is a circuit board in which a pattern (not illustrated) is formed at a back surface thereof.

Further, the conductive radiation element 320 in a shape of the substantial square is formed at a front surface of the dielectric member 310. In the main body portion 300, the dielectric member 310 (first dielectric member), and the radiation element 320 (first radiation element) are components to support a first frequency (e.g., a frequency in the L2 band).

The dielectric member 311 is disposed at a front surface of the radiation element 320, and the radiation element 321 is disposed at a front surface of the dielectric member 311. Here, in the main body portion 300, the dielectric member 311 (second dielectric member) and the radiation element 321 (second radiation element) are components to support a second frequency different from the first frequency (e.g., a frequency in the L1 band).

Further, as in the patch antenna 31, two metal bodies may be provided above the radiation element 321 for the main body portion 300 as such. Provision of such two metal bodies makes it possible to improve the axial ratio of the stacked patch antenna including the main body portion 300, as in the patch antenna 31.

==Radiation Element Including Slot==

Figure 17:
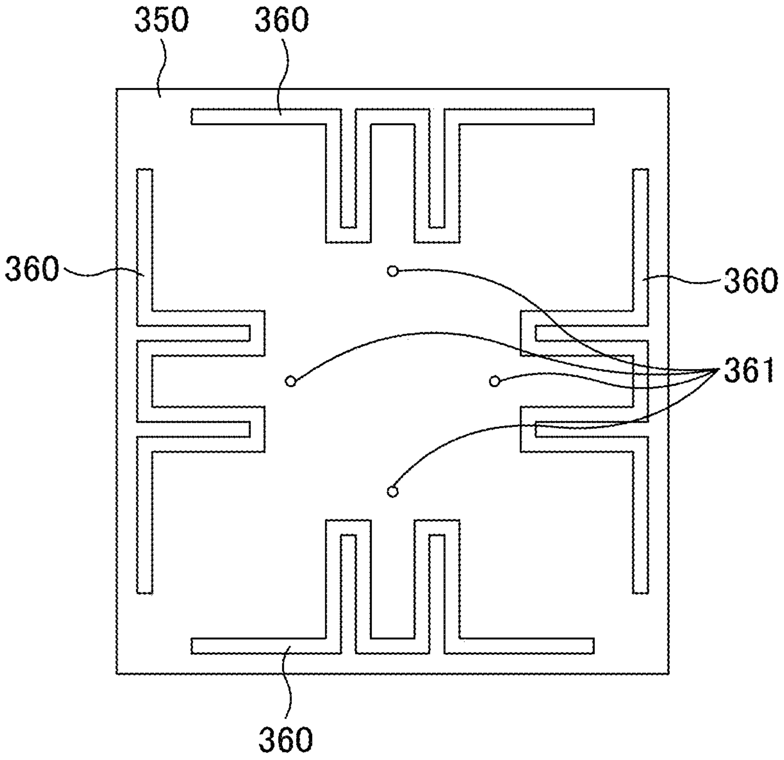
FIG. 17 is a diagram illustrating an example of a radiation element 350.

Further, the radiation element 53 of the patch antenna 31 according to an embodiment of the present disclosure is, for example, an element to support radio waves in a predetermined frequency band (e.g., radio waves in the L1 band for the GNSS), however, it is not limited thereto. For example, as illustrated in FIG. 17, a radiation element 350 to support radio waves in multiple frequency bands (e.g., the L1 and L2 bands) may be used.

The radiation element 350 has a shape of the substantial square and has a slot 360 at a position corresponding to each of four sides and four feeding points 361. The slot 360 is an opening formed in the radiation element 350, and has a meander shape as a means of adjusting an electric length of the slot 360. With such slots 360 formed in the radiation element 350, the radiation element 350 can emit (or reflect) radio waves in two frequency bands, for example.

==Relationship Between Patch Antenna and Ground Member==

When the patch antenna is arranged at the substantial center of a ground member functioning as a ground, the axial ratio of the patch antenna is improved. Here, a "ground member" may be any member as long as it functions as a ground and may be, for example, a metal base, a metal plate (so-called metal flat plate), and a member that is a combination of a metal base and a metal plate.

Further, the "substantial center" of the ground member includes, for example, the geometric center of the ground member viewed in plan view and is a region smaller than the area of the arranged patch antenna (e.g., the area of the patch antenna viewed in plan view). In order to further improve the axial ratio, the patch antenna is preferably arranged relative to the ground member such that the geometric center of the patch antenna and the geometric center of the ground member coincide in plan view.

FIGS. 18A to 18E are schematic views illustrating relationships between the patch antenna and the ground member. In each of FIGS. 18A to 18E, an upper part is a plan view, and a lower part is a cross-sectional view taken along an A-A line.

Figure 18A:
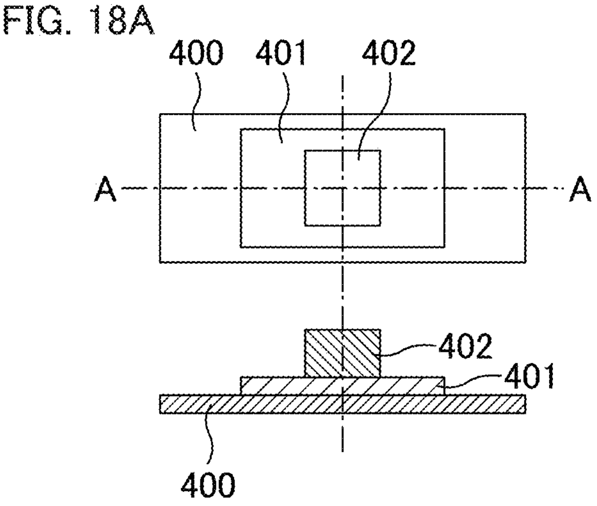
FIGS. 18A to 18E are schematic views illustrating relationships between a patch antenna and a ground member.

In FIG. 18A, a substrate 401 is provided at a front surface of a metal base 400 as the ground member. Further, a patch antenna 402 is provided at a front surface of the substrate 401. Here, in plan view, the patch antenna 402 is provided such that the geometric center of the quadrangular patch antenna 402 and the geometric center of the quadrangular metal base 400 coincide.

Figure 18B:
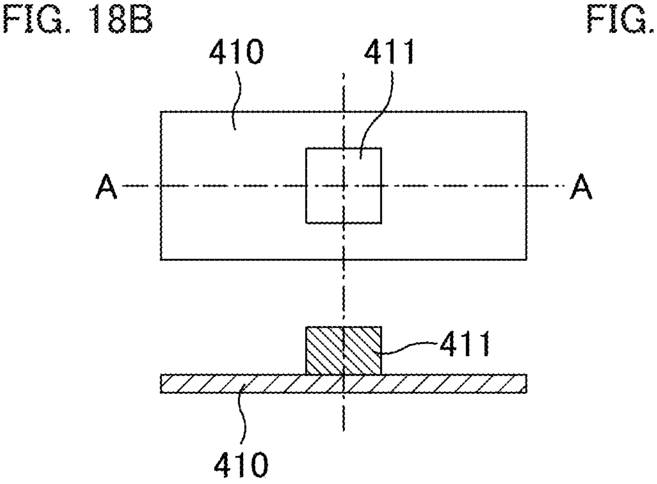

In FIG. 18B, a patch antenna 411 is provided at a front surface of a metal plate 410 serving as the ground member. In FIG. 18B as well, in plan view, the patch antenna 411 is arranged such that the geometric center of the quadrangular patch antenna 411 and the geometric center of the quadrangular metal plate 410 coincide.

Figure 18C:
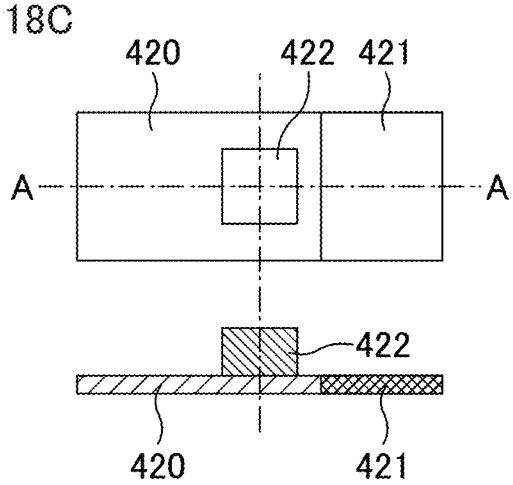

In FIG. 18C, a metal base 420 and a metal plate 421 are coupled to each other to function as a single ground. Further, a patch antenna 422 is provided at a front surface of the metal base 420. Here, in plan view, the patch antenna 422 is also arranged such that the geometric center of the quadrangular patch antenna 422 coincides with the geometric center of the ground member (quadrangle) formed of the metal base 420 and the metal plate 421.

Figure 18D:
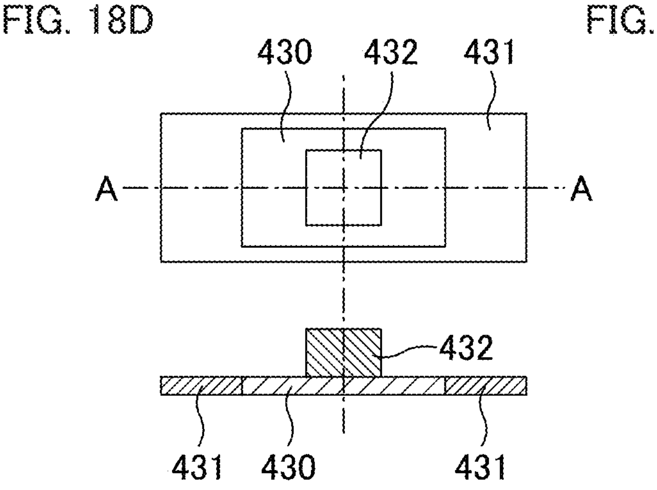

FIG. 18D illustrates a resin base 431 including a metal base 430 in the central portion thereof. Further, a patch antenna 432 is provided at a front surface of the metal base 430. Here, in plan view, the patch antenna 432 is also arranged on the metal base 430 such that the geometric center of the quadrangular patch antenna 432 and the geometric center of the quadrangular metal base 430 coincide.

Figure 18E:
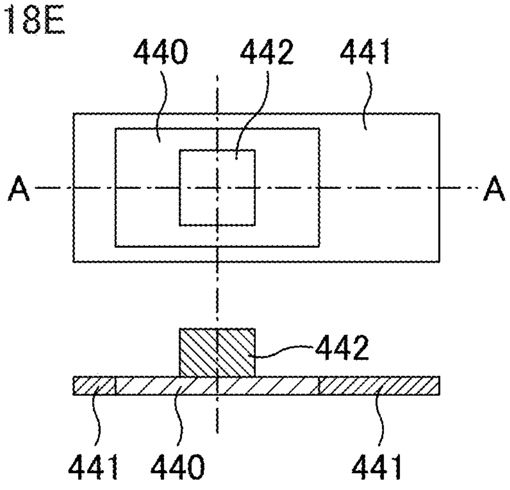

FIG. 18E illustrates a resin base 441 including a metal base 440 on the left side of the paper surface in the central portion. As in the case of FIG. 18D, a patch antenna 442 is arranged on the metal base 440 such that the geometric center of the quadrangular patch antenna 442 and the geometric center of the quadrangular metal base 440 coincide.

It is possible to suppress distortion in the directivity of the patch antenna and improve the axial ratio by arranging the patch antenna at the positions exemplified in FIGS. 18A to 18E. FIGS. 18A to 18E illustrate each of the patch antenna and the ground member (e.g., the metal base) as a quadrangle for the sake of convenience. However, it is not limited thereto and any shapes may be applicable as long as the patch antenna is arranged such that the geometric center of the patch antenna in plan view is "substantially the center" of the ground member or preferably coincides with the geometric center thereof.

Further, the patch antennas in FIGS. 18A to 18E are not limited to a patch antenna including typical dielectric member and radiation element. For example, the patch antenna 31 in FIG. 2, the patch antenna including the stacked main body portion 300 in FIGS. 16A and 16B, and the patch antenna using the radiation element 350 in FIG. 17 may be applicable thereto.

==Arrangement of Feed Line==

Figure 19:
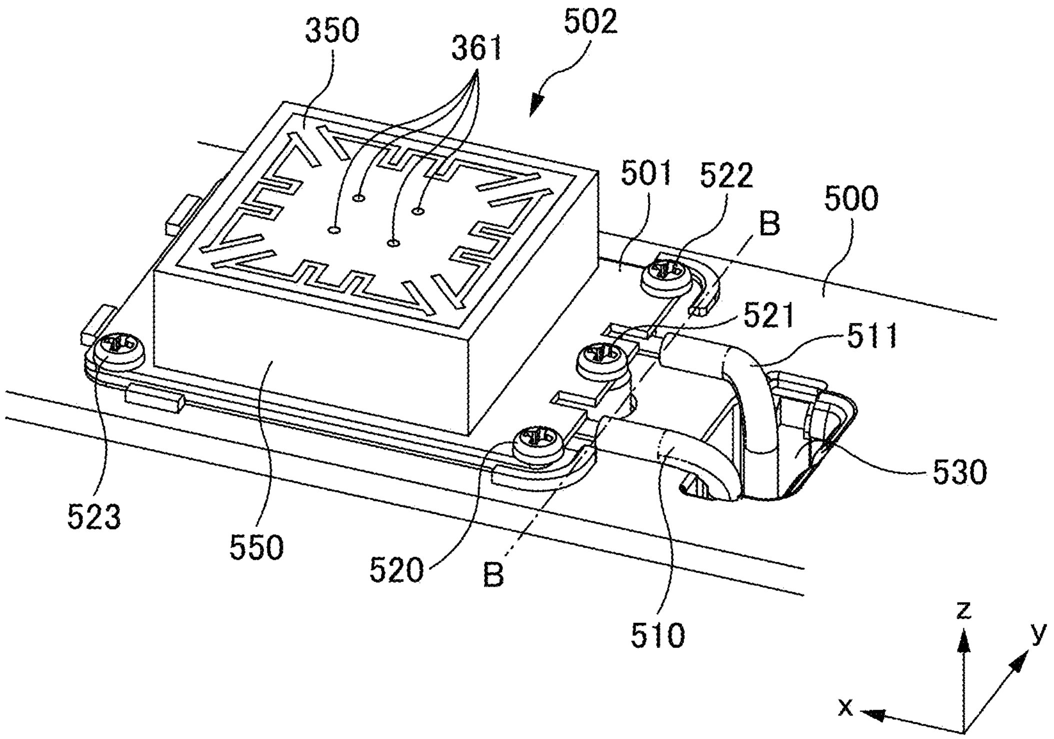
FIG. 19 is a perspective view of a patch antenna 502.

FIG. 19 is a perspective view of an example of a patch antenna. The patch antenna in FIG. 19 is, for example, included in a vehicular antenna device similar to that in FIG. 1, however, here, only a configuration around the patch antenna is illustrated, for the sake of convenience. Specifically, FIG. 19 illustrates a metal base 500, a substrate 501, a patch antenna 502, feed lines 510 and 511, and screws 520 to 523.

As in the metal base 22 of the antenna device 10 in FIG. 1, the metal base 500 is a plate-shaped member that functions as a ground, and the substrate 501 is attached to the metal base 500 with five screws (the screws 520 to 523 and a screw 524 (described later)). Further, in the metal base 500, an opening 530 extending through the metal base 500 is provided such that the feed lines 510 and 511 (described later) can be coupled with a device outside the vehicular antenna device.

As with the substrate 50 in FIG. 2, the substrate 501 is a circuit board having a back surface at which a pattern (not illustrated) is formed, and the patch antenna 502 is arranged at the substrate 501. The patch antenna 502 is, for example, an antenna that supports the L1 band and the L2 band for the GNSS and includes a dielectric member 550 and the above-described radiation element 350 in FIG. 17.

The feed lines 510 and 511 are coaxial cables coupling the patch antenna 502 and the device outside the vehicular antenna device with each other. An inner conductor (not illustrated) of each of the feed lines 510 and 511 is coupled to the feeding points 361 of the radiation element 350 through a conductor (not illustrated) or the like extending through a via hole (not illustrated) in the dielectric member 550 or a through-hole provided in the dielectric member 550, and an outer conductor (not illustrated) is, for example, coupled to a ground portion of the back surface of the substrate 501.

It is assumed here that the two feed lines 510 and 511 are coupled to the four feeding points 361, however, it is not limited thereto. For example, when the radiation element has two feeding points, the feed lines 510 and 511 may be coupled to the two feeding points. Further, in an embodiment of the present disclosure, the ground portion of the substrate 501 is electrically connected to the metal base 500, which will be described later in detail.

Figure 20:
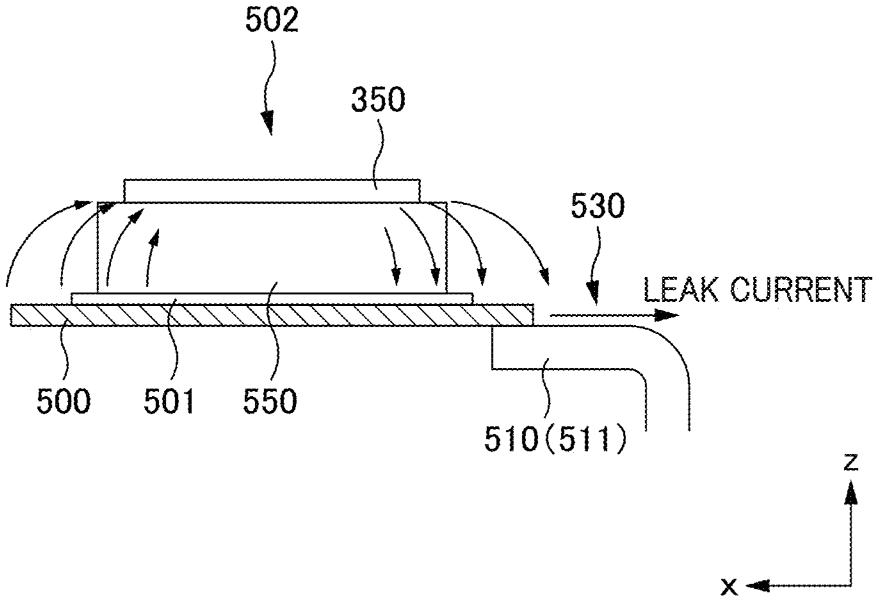
FIG. 20 is a schematic view illustrating an electric line of force around the patch antenna 502.

When the patch antenna 502 is operating, an electric field between the radiation element 350 of the patch antenna 502 and the metal base 500 changes. FIG. 20 is a schematic view illustrating an electric line of force between the patch antenna 502 and the metal base 500. As illustrated in FIG. 20, the feed lines 510 and 511 coupled to the patch antenna 502 are affected by the electric field. As a result, a leak current may be generated in each of the feed lines 510 and 511 due to the effect of the electric field.

Out of the feed lines 510 and 511, if the feed line 510 is affected more by the electric field than the feed line 511 is, the leak current generated in the feed line 510 increases greater. As a result, the directivity of the patch antenna 502 may be degraded.

Thus, in an embodiment of the present disclosure, the feed line 510 and the feed line 511 are arranged such that the effects of the electric field on the feed lines 510 and 511 are equalized.

Figure 21A:
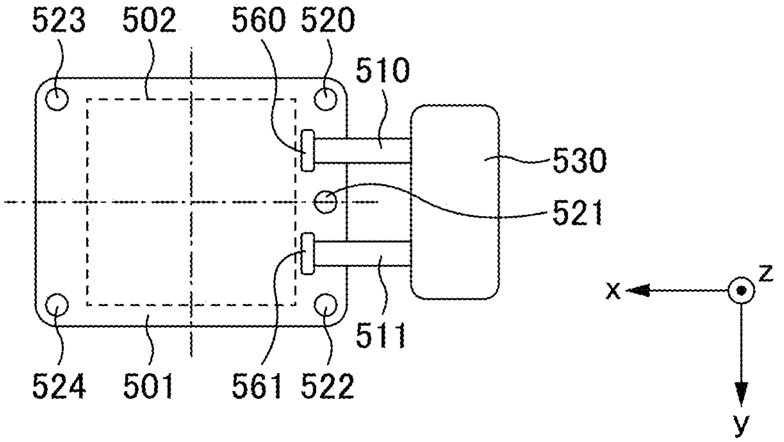
FIGS. 21A to 21C are schematic views for describing arrangements of feed lines 510 and 511.
Figure 21B:
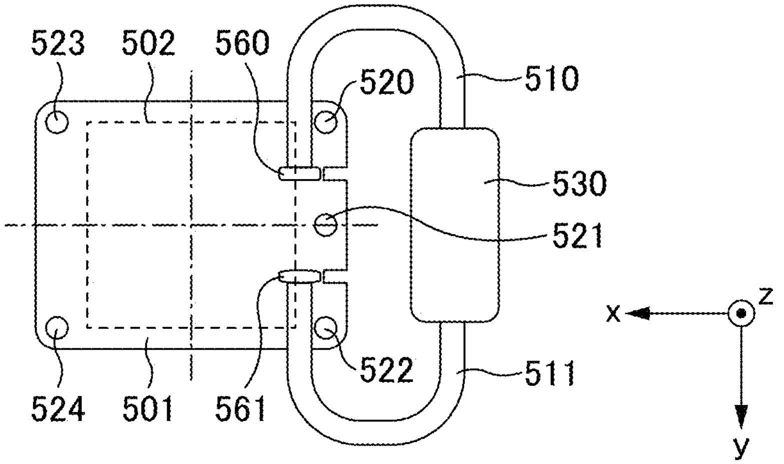
Figure 21C:
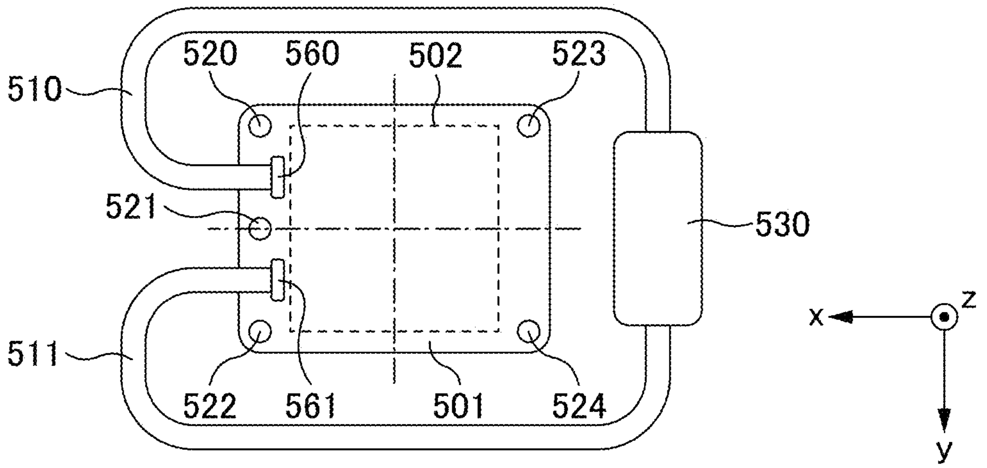

FIGS. 21A to 21C are schematic views for describing the arrangements of the feed lines in the back surface of the substrate 501. FIG. 21A is a schematic view of the metal base 500 in FIG. 19 when viewed from a −z direction, and thus the arrangement of the feed lines is described first with reference to FIG. 21A.

The schematic views of FIGS. 21A to 21C illustrate such that the geometric center of the quadrangle patch antenna 502 and the geometric center of the quadrangle substrate 501 are illustrated coincide in plan view, for the sake of convenience.

Coupling portions 560 and 561 are conductive members to which the inner conductors of the feed lines 510 and 511 attached to the back surface of the substrate 501 are coupled, respectively. Here, at the back surface of the substrate 501, the coupling portion 560 and the coupling portion 561 are arranged at positions that are symmetric with respect to an axis in the x direction passing through the geometric center of the patch antenna 502.

Further, in an embodiment in FIG. 19 (FIG. 21A), the feed line 510 and the feed line 511 are arranged so as to be symmetric with respect to the axis in the x direction passing through the geometric center of the patch antenna 502, from the coupling portions 560 and 561 to the opening 530. With such an arrangement, it is possible to substantially equalize the effects on the coupling portions 560 and 561 from the electric field of the patch antenna 502.

The arrangement of the feed line 510 and the feed line 511 herein are "symmetric" with respect to the axis in the x direction passing through the geometric center of the patch antenna 502, however, any arrangement may be applicable as long as the effects of the electric field on the feed lines 510 and 511, respectively, are substantially equal. Accordingly, the feed line 510 and the feed line 511 may be substantially symmetric with respect to the axis in the x direction passing through the geometric center of the patch antenna 502 such that the effects of the electric field received thereby are substantially equalized.

Further, the electric field from the patch antenna 502 decreases with distance from the patch antenna 502. Thus, any arrangement may be applicable as long as drawn-out portions of the feed line 510 and the feed line 511 that are relatively greatly affected by the electric field are arranged substantially symmetrically, for example. Here, the terms "drawn-out portion of a feed line" indicates, for example, a portion of the feed line from the coupling portion to a part at which the feed line is drawn out to be linear (the part at which the feed line is bent).

FIGS. 21B and 21C are diagrams illustrating other arrangement examples of the feed lines 510 and 511. Even with such arrangements, the effects of the electric field on the feed lines 510 and 511 are substantially equalized, thereby being able to improve the directivity of the patch antenna 502.

==Enhancement of Ground Function of Substrate 501==

In order to suppress the effects of the electric field on the feed lines 510 and 511, it is effective to enhance a ground function of the substrate 501 that is provided so as to cover a part of the feed lines 510 and 511. Thus, in an embodiment in FIG. 19, an impedance between the metal base 500 and the ground portion of the substrate 501 is reduced, with the screw 521 being provided in addition to the screws 520 and 522 to 524 at four corners of the substrate 501.

Figure 22:
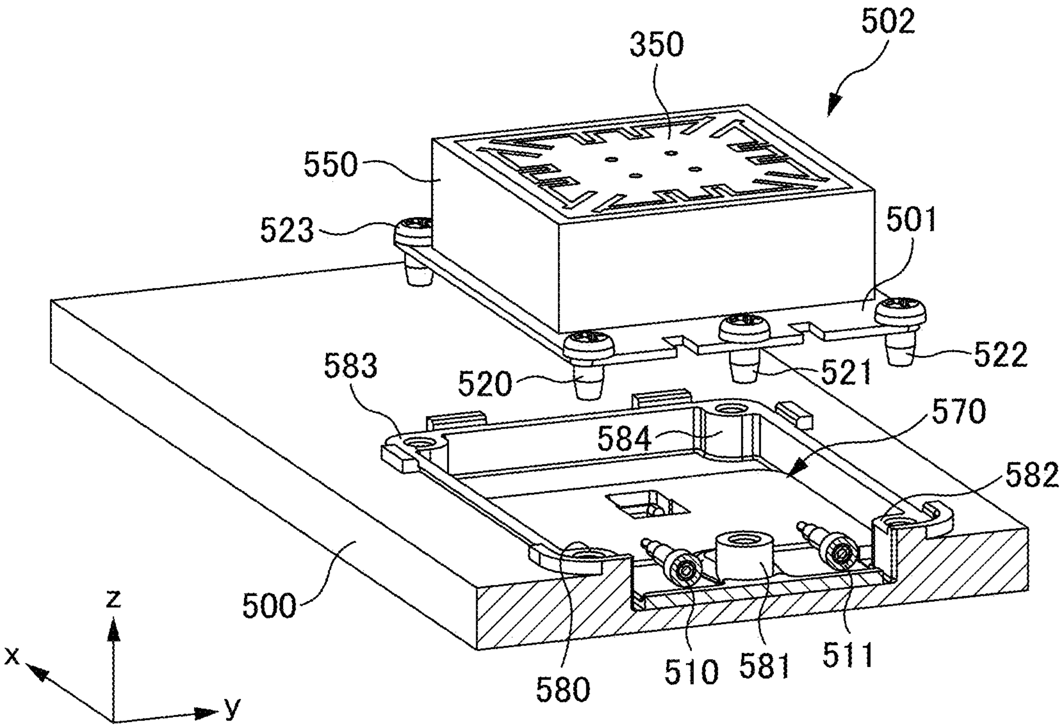
FIG. 22 is a cross-sectional perspective view taken along a B-B line in FIG. 19.

FIG. 22 is a cross-sectional perspective view taken along a B-B line in an embodiment in FIG. 19. Here, various elements (e.g., a capacitor and a coil) (not illustrated) are mounted on the back surface of the substrate 501. Thus, a recessed space 570 in a substantially rectangular parallelepiped shape is formed in the metal base 500 such that the substrate 501 having those elements mounted thereto can be attached to the metal base 500.

Support portions 580 and 582 to 584 to support the substrate 501 are formed at four corners of the space 570. Further, in an embodiment of the present disclosure, a support portion 581 to support the substrate 501 and also enhance the ground function of the substrate 501 is formed between the support portion 580 and the support portion 582.

Further, screw holes corresponding to the conductive screws 520 to 524 are formed in the support portions 580 to 584, respectively. Thus, when the screws 520 to 524 are attached in a state where the support portions 580 to 584 are supporting the substrate 501, the substrate 501 is fixed to the metal base 500.

Here, in the substrate 501, conductive ground portions (not illustrated) are formed where the screws 520 to 524 are attached and where supported by the support portions 580 to 584. Accordingly, when the conductive screws 520 to 524 are attached in a state where the substrate 501 is supported by the metal base 500, the metal base 500 and the substrate 501 are electrically connected to each other.

Further, in an embodiment in FIGS. 19 and 22, the feed line 510 (first feed line) is arranged in a region (first region) formed between the support portion 580 and the support portion 581, and the feed line 511 (second feed line) is arranged in a region (second region) formed between the support portion 581 and the support portion 582.

Accordingly, both the feed lines 510 and 511 are partially covered with the substrate 501 having a ground function enhanced by virtue of the screw 521 and the support portion 581. As a result, in an embodiment of the present disclosure, it is possible to suppress the effects of the electric field on the feed lines 510 and 511. Further, since the ground function of the substrate 501 is enhanced, it is also possible to suppress the effect of noise (e.g., radiation noise) from the feed lines 510 and 511.

In an embodiment of the present disclosure, the substrate 501 is fixed to the metal base 500 by attaching the screws 520 to 524 into the screw holes of the support portions 580 to 584, however, it is not limited thereto. For example, the substrate 501 may be directly fixed to the support portions 580 to 584 by soldering and/or the like. Even in such a case, it is possible to obtain a similar effect as in the case of using the screws.

==Shield==

Figure 23A:
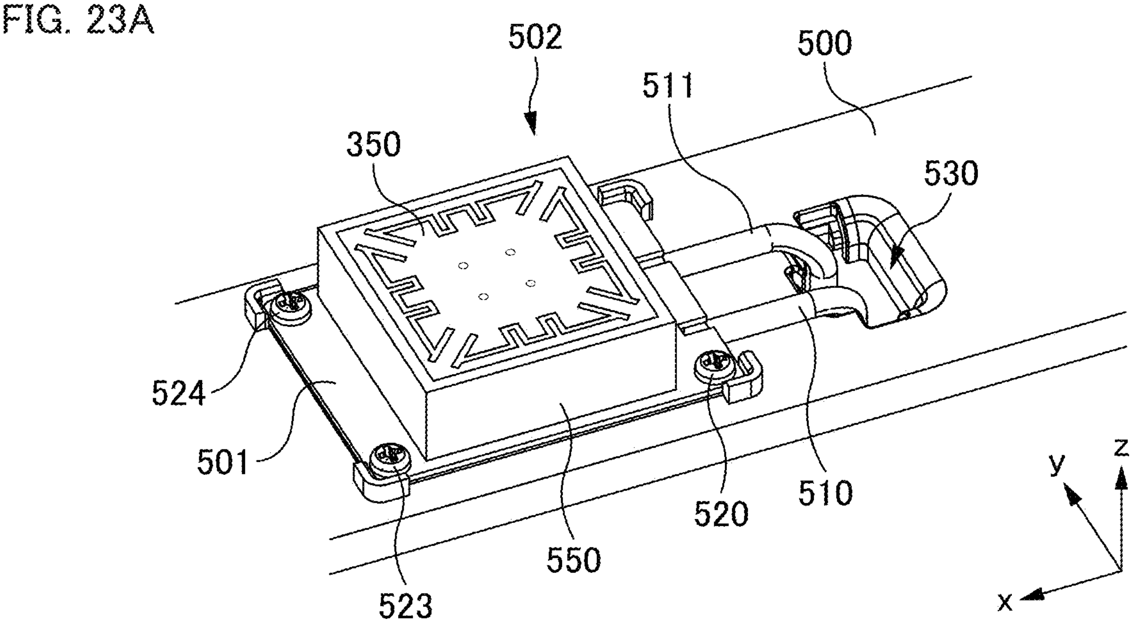
FIGS. 23A and 23B are diagrams for describing a shield member 590.
Figure 23B:
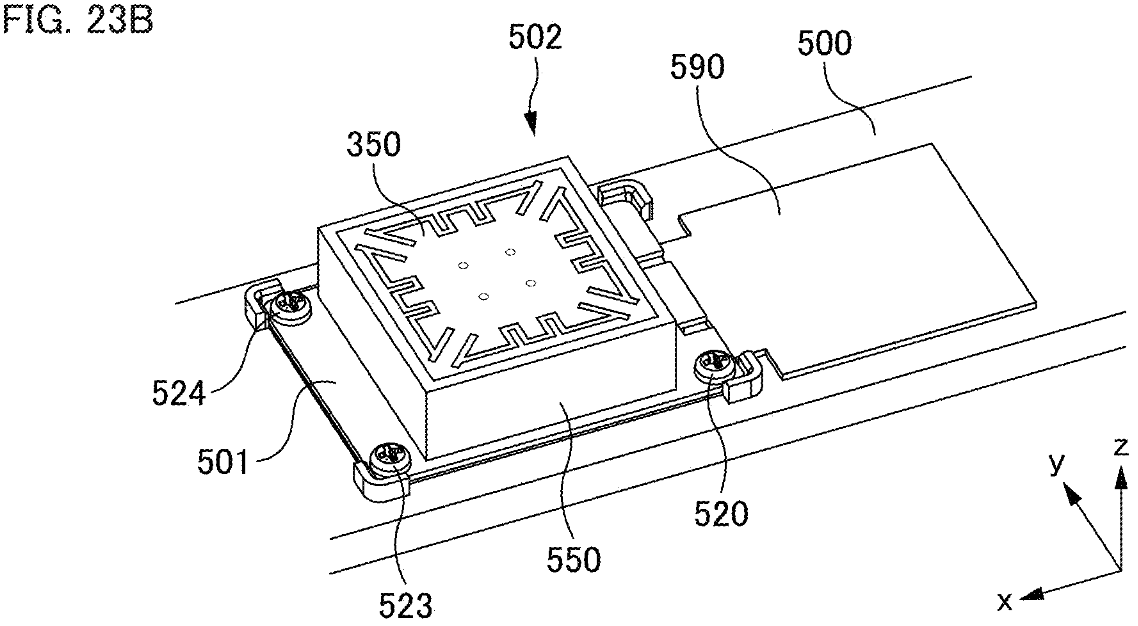

With reference to FIG. 22 and the like, it has been described that the ground function of the substrate 501 is enhanced in order to suppress the effects on the feed lines 510 and 511 or the effects from the feed lines 510 and 511, however, for example, a shield member may be used as illustrated in FIGS. 23A and 23B.

FIGS. 23A and 23B are diagrams for describing a relationship between the patch antenna 502 and the shield member. FIG. 23A illustrates a state of including no shield member, and FIG. 23B illustrates a state of including the shield member. A configuration other than the shield member in FIG. 23B is the same as in FIG. 19 and the like, for example, and thus the shield member is mainly described.

A shield member 590 is a metal plate provided to cover the feed lines 510 and 511 and the opening 530 in a front surface of the metal base 500. Further, the shield member 590 is, for example, electrically connected to the metal base 500 with (a) conductive screw(s) (not illustrated).

Figure 24:
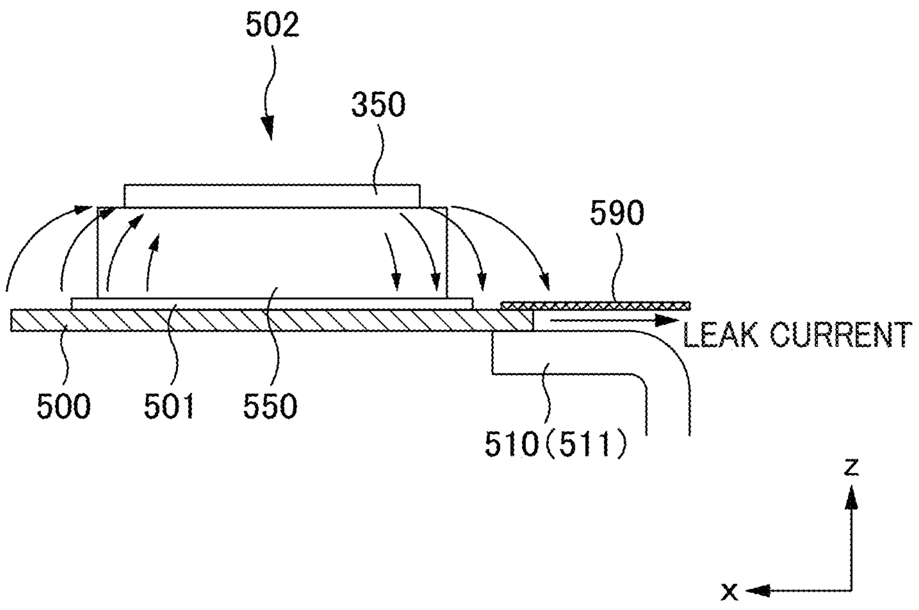
FIG. 24 is a schematic view illustrating the electric line of force around the patch antenna 502.

As a result, for example, as illustrated in FIG. 24, it is possible to prevent the electric field from the patch antenna 502 from affecting the feed lines 510 and 511. Further, the shield member 590 can suppress the effect from noise generated by the feed lines 510 and 511 on a device (e.g., the patch antenna 502) provided to the front surface of the metal base 500.

The shield member 590 herein covers the entire feed lines 510 and 511 extending from the substrate 501, however, the shield member 590 may cover a part thereof. Further, instead of the shield member 590, a ferrite core may be attached to the feed lines 510 and 511. Even with such a configuration, it is possible to obtain effect similar to that of an embodiment of FIG. 23B.

SUMMARY

The vehicular antenna devices 10 to 12 according to embodiments of the present disclosure are described above. For example, in the patch antenna 31, two sheets of (n=2) metal bodies 55 and 57 are provided above the radiation element 53. Further, the areas of the metal bodies 55 and 57 are different from each other. The patch antenna 31 having such a configuration makes it possible to improve the axial ratio of the patch antenna 31.

Further, the number of the metal bodies provided above the radiation element 53 may be any number as long as it is a natural number of 2 or greater. However, particularly, by setting the number thereof to two or three, it is possible to improve the axial ratio while reducing the height of the patch antenna 31. That is, even when there is a height restriction, such as in a case of a shark fin-shaped vehicular antenna device, a roof-embedded vehicular antenna device, and the like, it is possible to arrange the patch antenna 31 capable of improving the axial ratio.

Moreover, in the patch antenna 31, the distance D1 between the radiation element 53 and the metal body 55 in the +z direction perpendicular to the upper surface of the radiation element 53 is $\lambda/10$ or smaller of the operating frequency. Accordingly, for example, as illustrated in FIG. 7, it is possible to improve the axial ratio of a low elevation angle of the patch antenna 31.

Furthermore, the distance D2 between the metal body 57 and the metal body 55 in the +z direction perpendicular to the upper surface of the radiation element 53 is A/10 or smaller of the operating frequency. Accordingly, for example, as illustrated in FIG. 8, it is possible to further improve the axial ratio of a low elevation angle of the patch antenna 31.

Further, the area of the metal body 55 is equal to or greater than the area of a square having a side length L of 20 mm ($\lambda/10$). Accordingly, for example, as illustrated in FIG. 9, it is possible to improve the axial ratio of a low elevation angle of the patch antenna 31. The metal body 55 may have any shape, as long as the area of the metal body 55 is equal to or greater than the area of a square having a side length L of 20 mm ($\lambda/10$).

Moreover, the area of the metal body 55 is equal to or smaller than the area of a square having a side length L of 50 mm ($\lambda/4$). Accordingly, for example, as illustrated in FIG. 9, it is possible to improve the axial ratio of a low elevation angle of the patch antenna 31. The metal body 55 may have any shape, as long as the area of the metal body 55 is equal to or smaller than the area of a square having a side length L of 50 mm ($\lambda/4$).

Furthermore, the area of the metal body 57 may be, for example, 0.5 times or greater and smaller than 1.0 times the area of the metal body 55. In such a case, particularly, it is possible to improve the axial ratio of a low elevation angle to a medium elevation angle of the patch antenna 31. Further, the area of the metal body 57 may be, for example, greater than 1.0 times and equal to or smaller than 1.5 times the area of the metal body 55. In such a case, for example, as illustrated in FIG. 10, it is possible to improve the axial ratio of a medium elevation angle to a high elevation angle of the patch antenna 31.

Further, the holding member 54 holds the metal body 55 such that the center of the radiation element 53 and the center of the metal body 55 coincide. Thus, in the patch antenna 31, it is possible to reduce the size, and further improve the axial ratio. Further, the holding member 54 is provided at the front surface of the dielectric member 52. Thus, for example, it is possible to further downsize the patch antenna 31 more than in a case of providing the holding member 54 to the substrate 50.

Moreover, the holding member 56 holds the metal body 57 such that the center of the metal body 55 and the center of the metal body 57 coincide. Thus, in the patch antenna 31, it is possible to reduce the size, and further improve the axial ratio. Further, the holding member 56 is provided at the front surface of the metal body 55. Thus, for example, it is possible to further downsize the patch antenna 31 more than in a case of providing the holding member 56 to the substrate 50.

Furthermore, in the patch antenna 31, each of the radiation element 53 and the metal bodies 55 and 57 is in a shape of the substantial square. Thus, the patch antenna 31 can cause the corresponding centers to easily coincide.

Further, in the vehicular antenna device 11, the metal body 100*a* is used as the top plate instead of the metal body 57. Even with such a configuration, it is possible to improve the axial ratio of the patch antenna 33.

Moreover, in the vehicular antenna device 12, the metal body 100*a* corresponding to the third (n=3) top plate is provided above the metal bodies 55 and 57. Even with such a configuration, it is possible to improve the axial ratio of the patch antenna 33.

The term "vehicular" in an embodiment of the present disclosure means to be mountable to a vehicle. Thus, it is not limited to one attached to a vehicle, but also includes one to be brought into a vehicle to be used in the vehicle. Further, it is assumed that the antenna device according to an embodiment of the present disclosure is used for a "vehicle" that is a vehicle provided with wheels, however, it is not limited thereto and, for example, the antenna device may be used for a movable body such as a flight vehicle including a drone and the like, a probe vehicle, a construction machinery, an agricultural machinery, a vessel, and the like without wheels.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

REFERENCE SIGNS LIST

- 10, 11, 12 vehicular antenna device
- 20 antenna base
- 21, 22, 400, 420, 430, 440, 500 metal base
- 23 case
- 30, 31, 402, 411, 422, 432, 442, 502 patch antenna
- 32 antenna
- 50, 330, 401, 501 substrate
- 51 pattern
- 52, 310, 311, 550 dielectric member
- 53, 320, 321, 350 radiation element
- 54, 56 holding member
- 55, 57, 100*a* to 100*d*, 200 to 203 metal body
- 62, 65 protruding portion
- 63, 64, 66 recessed portion
- 80 helical element (coil)
- 100 capacitively loaded element
- 110 filter
- 300 main body portion
- 360 slot
- 361 feeding point
- 410, 421 metal plate
- 431, 441 resin base
- 510, 511 feed line
- 520 to 524 screw
- 530 opening
- 570 space
- 580 to 584 support portion
- 590 shield member

The invention claimed is:

1. A vehicular antenna device, comprising: a patch antenna including a radiation element, and n metal bodies that are positioned above the radiation element, the n being a natural number of 2 or greater, and an antenna configured to operate in a frequency band different from a desired frequency band of the patch antenna, wherein an area of at least one of the n metal bodies is different from an area of any other metal body of the n metal bodies, the n metal bodies include a first metal body and a second metal body, respectively, the first metal body is provided at a distance equal to or smaller than one-tenth of a wavelength in the desired frequency band of the patch antenna, from the radiation element in a direction perpendicular to an upper surface of the radiation element, the second metal body is arranged at a position closer to the first metal body than the radiation element in the direction perpendicular to the upper surface of the radiation element, the first metal body is a parasitic element, the antenna includes an antenna element, and a part of the antenna element is the second metal body.

2. The vehicular antenna device according to claim 1, wherein the second metal body is provided at a distance equal to or smaller than one-tenth of the wavelength in the desired frequency band of the patch antenna, from the first metal body.

3. The vehicular antenna device according to claim 1, wherein an area of the first metal body is equal to or greater than an area of a square having each side equal to one-tenth of the wavelength in the desired frequency band of the patch antenna.

4. The vehicular antenna device according to claim 3, wherein the area of the first metal body is equal to or smaller than an area of a square having each side equal to a quarter of the wavelength in the desired frequency band of the patch antenna.

5. The vehicular antenna device according to claim 1, wherein an area of the second metal body is in a range of from 0.5 times to less than 1.0 times an area of the first metal body or a range of from more than 1.0 times to 1.5 times the area of the first metal body.

6. A vehicular antenna device, comprising: a patch antenna including a radiation element, and n metal bodies that are positioned above the radiation element, the n being a natural number of 2 or greater, and an antenna configured to operate in a frequency band different from a desired frequency band of the patch antenna, wherein an area of at least one of the n metal bodies is different from an area of any other metal body of the n metal bodies, the n metal bodies include a first metal body, a second metal body and a third metal body, respectively, the first metal body is provided at a distance equal to or smaller than one-tenth of a wavelength in the desired frequency band of the patch antenna, from the radiation element in a direction perpendicular to an upper surface of the radiation element, the second metal body is arranged at a position closer to the first metal body than the radiation element in the direction perpendicular to the upper surface of the radiation element, the first metal body is a parasitic element, the antenna includes an antenna element, and a part of the antenna element corresponds to the third metal body.

7. The vehicular antenna device according to claim 6, wherein the second metal body is provided at a distance equal to or smaller than one-tenth of the wavelength in the desired frequency band of the patch antenna, from the first metal body.

8. The vehicular antenna device according to claim 6, wherein an area of the first metal body is equal to or greater than an area of a square having each side equal to one-tenth of the wavelength in the desired frequency band of the patch antenna.

9. The vehicular antenna device according to claim 8, wherein the area of the first metal body is equal to or smaller than an area of a square having each side equal to a quarter of the wavelength in the desired frequency band of the patch antenna.

10. The vehicular antenna device according to claim 6, wherein an area of the second metal body is in a range of from 0.5 times to less than 1.0 times an area of the first metal body or a range of from more than 1.0 times to 1.5 times the area of the first metal body.

* * * * *